(12) United States Patent
Ross et al.

(10) Patent No.: US 11,711,374 B2
(45) Date of Patent: Jul. 25, 2023

(54) SYSTEMS AND METHODS FOR UNDERSTANDING IDENTITY AND ORGANIZATIONAL ACCESS TO APPLICATIONS WITHIN AN ENTERPRISE ENVIRONMENT

(71) Applicant: vArmour Networks, Inc., Los Altos, CA (US)

(72) Inventors: Colin Ross, Arlington, TX (US); Marc Woolward, Bude (GB); Keith Stewart, San Francisco, CA (US); Paul Bigbee, Palo Alto, CA (US); Hsisheng Wang, Taipei (TW)

(73) Assignee: vArmour Networks, Inc., Los Altos, CA (US)

( * ) Notice: Subject to any disclaimer, the term of this patent is extended or adjusted under 35 U.S.C. 154(b) by 0 days.

(21) Appl. No.: 17/170,320

(22) Filed: Feb. 8, 2021

(65) Prior Publication Data

US 2021/0168150 A1 Jun. 3, 2021

Related U.S. Application Data

(63) Continuation-in-part of application No. 17/133,466, filed on Dec. 23, 2020, which is a continuation-in-part of application No. 16/428,828, filed on May 31, 2019, now Pat. No. 11,575,563.

(51) Int. Cl.
*H04L 9/40* (2022.01)
*G06F 16/21* (2019.01)
(Continued)

(52) U.S. Cl.
CPC .......... *H04L 63/102* (2013.01); *G06F 16/212* (2019.01); *G06Q 10/0635* (2013.01); *G06Q 10/105* (2013.01)

(58) Field of Classification Search
CPC . H04L 63/102; G06F 16/212; G06Q 10/0635; G06Q 10/105
See application file for complete search history.

(56) References Cited

U.S. PATENT DOCUMENTS 6,158,007 A 12/2000 Moreh et al.
6,253,321 B1 6/2001 Nikander et al.
(Continued)

FOREIGN PATENT DOCUMENTS

TW 201642616 A 12/2016
TW 201642617 A 12/2016
(Continued)

OTHER PUBLICATIONS

"International Search Report" and "Written Opinion of the International Searching Authority," Patent Cooperation Treaty Application No. PCT/US2016/024116, dated May 3, 2016, 12 pages.
(Continued)

*Primary Examiner* — William G Trost, IV
*Assistant Examiner* — Monishwar Mohan
(74) *Attorney, Agent, or Firm* — Carr & Ferrell LLP

(57) ABSTRACT

Methods and systems for understanding identity and organizational access to applications within an enterprise environment are provided. Exemplary methods include collecting data about relationships between applications and metadata associated with the applications in a computing environment of an enterprise, the metadata including information concerning a plurality of users accessing the applications; updating a graph database including nodes representing the applications of the computing environment of the enterprise and edges representing relationships between the applications; enriching the graph database by associating the nodes with metadata associated with the applications and associating user accounts with metadata associated with roles, organizations membership, privileges, and permissions; analyzing the graph database to identify a subset of nodes being accessed by a user of the plurality of users; and displaying, via a graphical user interface, a graphical rep-
(Continued)

resentation of the subset of nodes and relationships between the nodes in the subset of the nodes.

18 Claims, 13 Drawing Sheets

(51) Int. Cl.
    *G06Q 10/0635*      (2023.01)
    *G06Q 10/105*      (2023.01)

(56) References Cited

U.S. PATENT DOCUMENTS

| | | |
|---|---|---|
| 6,484,261 B1 | 11/2002 | Wiegel |
| 6,578,076 B1 | 6/2003 | Putzolu |
| 6,765,864 B1 | 7/2004 | Natarajan et al. |
| 6,832,243 B1 | 12/2004 | Mikaisen et al. |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1 | 4/2009 | Kloth et al. |
| 7,533,128 B1 | 5/2009 | Sanchez et al. |
| 7,627,671 B1 * | 12/2009 | Palma ............... G06F 11/3616 709/224 |
| 7,694,181 B2 | 4/2010 | Noller et al. |
| 7,725,937 B1 | 5/2010 | Levy |
| 7,742,414 B1 | 6/2010 | Iannaccone et al. |
| 7,774,837 B2 | 8/2010 | McAlister |
| 7,797,306 B1 | 9/2010 | Pather et al. |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel et al. |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,539,548 B1 | 9/2013 | Overby, Jr. et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,798,055 B1 | 8/2014 | An |
| 8,813,169 B2 | 8/2014 | Shieh |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,021,546 B1 | 4/2015 | Banerjee |
| 9,027,077 B1 | 5/2015 | Bharali et al. |
| 9,036,639 B2 | 5/2015 | Zhang |
| 9,060,025 B2 | 6/2015 | Xu |
| 9,141,625 B1 | 9/2015 | Thornewell et al. |
| 9,191,327 B2 | 11/2015 | Shieh et al. |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,405,665 B1 | 8/2016 | Shashi et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,794,289 B1 | 10/2017 | Banerjee et al. |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 10,116,441 B1 | 10/2018 | Rubin et al. |
| 10,191,758 B2 | 1/2019 | Ross et al. |
| 10,193,929 B2 | 1/2019 | Shieh et al. |
| 10,264,025 B2 | 4/2019 | Woolward |
| 10,333,827 B2 | 6/2019 | Xu et al. |
| 10,333,986 B2 | 6/2019 | Lian et al. |
| 10,382,467 B2 | 8/2019 | Wager et al. |
| 10,528,897 B2 | 1/2020 | Labat et al. |
| 10,554,604 B1 | 2/2020 | Burcham et al. |
| 10,630,703 B1 | 4/2020 | Ghosh et al. |
| 10,755,334 B2 | 8/2020 | Eades et al. |
| 10,862,748 B1 | 12/2020 | Deruijter |
| 11,290,493 B2 | 3/2022 | Woolward et al. |
| 11,290,494 B2 | 3/2022 | Li et al. |
| 11,310,284 B2 | 4/2022 | Woolward et al. |
| 11,470,684 B2 | 10/2022 | Hu et al. |
| 11,575,563 B2 | 2/2023 | Woolward et al. |
| 2002/0031103 A1 | 3/2002 | Wiedeman et al. |
| 2002/0066034 A1 | 5/2002 | Schlossberg et al. |
| 2002/0178273 A1 | 11/2002 | Pardo-Bastellote et al. |
| 2003/0055950 A1 | 3/2003 | Cranor et al. |
| 2003/0177389 A1 | 9/2003 | Albert et al. |
| 2003/0227392 A1 | 12/2003 | Ebert et al. |
| 2004/0062204 A1 | 4/2004 | Bearden et al. |
| 2004/0095897 A1 | 5/2004 | Vafaei |
| 2004/0143631 A1 | 7/2004 | Banerjee et al. |
| 2004/0172557 A1 | 9/2004 | Nakae et al. |
| 2004/0240458 A1 | 12/2004 | Tv et al. |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0119905 A1 | 6/2005 | Wong et al. |
| 2005/0125768 A1 | 6/2005 | Wong et al. |
| 2005/0154576 A1 | 7/2005 | Tarui |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2006/0085412 A1 | 4/2006 | Johnson et al. |
| 2006/0168070 A1 | 7/2006 | Thompson et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0027801 A1 | 2/2007 | Botzer et al. |
| 2007/0064617 A1 | 3/2007 | Reves |
| 2007/0079308 A1 | 4/2007 | Chiaramonte et al. |
| 2007/0130566 A1 | 6/2007 | Van Rietschote |
| 2007/0157286 A1 | 7/2007 | Singh et al. |
| 2007/0162400 A1 | 7/2007 | Brew et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |

(56) References Cited

U.S. PATENT DOCUMENTS

| | | |
|---|---|---|
| 2007/0234369 A1 | 10/2007 | Paramisivam et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0195670 A1* | 8/2008 | Boydstun ............ G06F 11/3476 |
| 2008/0229382 A1 | 9/2008 | Vitalos |
| 2008/0239961 A1 | 10/2008 | Hilerio et al. |
| 2008/0263179 A1 | 10/2008 | Buttner et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0077666 A1 | 3/2009 | Chen et al. |
| 2009/0083445 A1 | 3/2009 | Ganga |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Birnbach |
| 2010/0095367 A1 | 4/2010 | Narayanaswamy |
| 2010/0125476 A1 | 5/2010 | Yeom et al. |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0210428 A1 | 8/2012 | Blackwell |
| 2012/0216273 A1 | 8/2012 | Rolette et al. |
| 2012/0224057 A1 | 9/2012 | Gill et al. |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324069 A1 | 12/2012 | Nori et al. |
| 2012/0324567 A1 | 12/2012 | Couto et al. |
| 2013/0019277 A1 | 1/2013 | Chang et al. |
| 2013/0054536 A1 | 2/2013 | Sengupta |
| 2013/0081142 A1 | 3/2013 | McDougal et al. |
| 2013/0086399 A1 | 4/2013 | Tychon et al. |
| 2013/0097138 A1 | 4/2013 | Barkol et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166681 A1 | 6/2013 | Thompson et al. |
| 2013/0166720 A1 | 6/2013 | Takashima et al. |
| 2013/0198799 A1* | 8/2013 | Staggs ................ H04L 63/105 726/1 |
| 2013/0198840 A1 | 8/2013 | Drissi et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0298243 A1 | 11/2013 | Kumar et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0033267 A1 | 1/2014 | Aciicmez |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0337743 A1 | 11/2014 | Branton |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0180949 A1 | 6/2015 | Maes |
| 2015/0229641 A1 | 8/2015 | Sun et al. |
| 2015/0235229 A1 | 8/2015 | Pryor |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0072899 A1 | 3/2016 | Tung et al. |
| 2016/0105370 A1 | 4/2016 | Mellor et al. |
| 2016/0162179 A1* | 6/2016 | Annett ................ G06F 3/0488 715/709 |
| 2016/0171682 A1 | 6/2016 | Abedini et al. |
| 2016/0173521 A1 | 6/2016 | Yampolskiy et al. |
| 2016/0191466 A1 | 6/2016 | Pernicha |
| 2016/0191545 A1 | 6/2016 | Nanda et al. |
| 2016/0203331 A1 | 7/2016 | Khan et al. |
| 2016/0234250 A1 | 8/2016 | Ashley et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0301704 A1 | 10/2016 | Hassanzadeh et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2016/0357424 A1 | 12/2016 | Pang et al. |
| 2016/0357774 A1 | 12/2016 | Gauchi et al. |
| 2017/0005986 A1 | 1/2017 | Bansal et al. |
| 2017/0006135 A1 | 1/2017 | Siebel et al. |
| 2017/0063795 A1 | 3/2017 | Lian et al. |
| 2017/0075744 A1 | 3/2017 | Deshpande et al. |
| 2017/0085654 A1 | 3/2017 | Mikhailov et al. |
| 2017/0118218 A1* | 4/2017 | Koottayi ............ H04L 63/102 |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |

(56) References Cited

U.S. PATENT DOCUMENTS

| | | | |
|---|---|---|---|
| 2017/0223033 | A1 | 8/2017 | Wager et al. |
| 2017/0223038 | A1 | 8/2017 | Wager et al. |
| 2017/0251013 | A1 | 8/2017 | Kirti |
| 2017/0264619 | A1 | 9/2017 | Narayanaswamy et al. |
| 2017/0264640 | A1 | 9/2017 | Narayanaswamy et al. |
| 2017/0279770 | A1 | 9/2017 | Woolward |
| 2017/0295188 | A1 | 10/2017 | David et al. |
| 2017/0302685 | A1 | 10/2017 | Ladnai et al. |
| 2017/0339188 | A1 | 11/2017 | Jain et al. |
| 2017/0374032 | A1 | 12/2017 | Woolward et al. |
| 2017/0374101 | A1 | 12/2017 | Woolward |
| 2018/0005296 | A1 | 1/2018 | Eades et al. |
| 2018/0083977 | A1* | 3/2018 | Murugesan ......... G06F 21/6218 |
| 2018/0095976 | A1 | 4/2018 | Shelksohn |
| 2018/0113773 | A1 | 4/2018 | Kirshnan et al. |
| 2018/0137506 | A1 | 5/2018 | Kel et al. |
| 2018/0191779 | A1 | 7/2018 | Shieh et al. |
| 2018/0191813 | A1 | 7/2018 | Harpaz et al. |
| 2018/0225795 | A1 | 8/2018 | Napoli |
| 2018/0232262 | A1* | 8/2018 | Chowdhury ............ G06F 9/541 |
| 2018/0254892 | A1 | 9/2018 | Egorov et al. |
| 2018/0293701 | A1 | 10/2018 | Appu et al. |
| 2018/0329940 | A1 | 11/2018 | Tiku et al. |
| 2018/0375877 | A1 | 12/2018 | Jakbsson et al. |
| 2019/0014153 | A1 | 1/2019 | Lang et al. |
| 2019/0043534 | A1* | 2/2019 | Sievert ................. G11B 27/036 |
| 2019/0052549 | A1 | 2/2019 | Duggal et al. |
| 2019/0081963 | A1 | 3/2019 | Waghorn |
| 2019/0109820 | A1 | 4/2019 | Clark et al. |
| 2019/0141075 | A1* | 5/2019 | Gay .................... H04L 63/1416 |
| 2019/0273746 | A1 | 9/2019 | Coffing |
| 2019/0278760 | A1 | 9/2019 | Smart |
| 2019/0317728 | A1 | 10/2019 | Chen et al. |
| 2019/0342307 | A1 | 11/2019 | Gamble et al. |
| 2019/0394225 | A1 | 12/2019 | Vajipayajula et al. |
| 2020/0043008 | A1 | 2/2020 | Hrabik |
| 2020/0065343 | A1* | 2/2020 | Morkovine .......... G06Q 10/103 |
| 2020/0074078 | A1 | 3/2020 | Saxe et al. |
| 2020/0076826 | A1* | 3/2020 | Ford ....................... H04L 63/12 |
| 2020/0145441 | A1 | 5/2020 | Patterson et al. |
| 2020/0169565 | A1 | 5/2020 | Badawy et al. |
| 2020/0259852 | A1* | 8/2020 | Wolff .................. H04L 63/1441 |
| 2020/0329118 | A1 | 10/2020 | Wang et al. |
| 2020/0382363 | A1 | 12/2020 | Woolward et al. |
| 2020/0382556 | A1 | 12/2020 | Woolward et al. |
| 2020/0382557 | A1 | 12/2020 | Woolward et al. |
| 2020/0382560 | A1 | 12/2020 | Woolward et al. |
| 2020/0382586 | A1 | 12/2020 | Badawy et al. |
| 2021/0120029 | A1 | 4/2021 | Ross et al. |
| 2021/0126837 | A1 | 4/2021 | Dinh et al. |
| 2022/0036302 | A1 | 2/2022 | Cella et al. |
| 2022/0201024 | A1 | 6/2022 | Ross et al. |
| 2022/0201025 | A1 | 6/2022 | Ross et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 A1 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

"International Search Report" and "Written Opinion of the International Searching Authority," Patent Cooperation Treaty Application No. PCT/US2016/024300, dated May 3, 2016, 9 pages.

"International Search Report" and "Written Opinion of the International Searching Authority," Patent Cooperation Treaty Application No. PCT/US2016/024053, dated May 3, 2016, 12 pages.

"International Search Report" and "Written Opinion of the International Searching Authority," Patent Cooperation Treaty Application No. PCT/US2016/019643, dated May 6, 2016, 27 pages.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.

"International Search Report" and "Written Opinion of the International Searching Authority," Patent Cooperation Treaty Application No. PCT/US2016/024310, dated Jun. 20, 2016, 9 pages.

"Feature Handbook: NetBrain® Enterprise Edition 6.1" NetBrain Technologies, Inc., Feb. 25, 2016, 48 pages.

Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.

"International Search Report" and "Written Opinion of the International Searching Authority," Patent Cooperation Treaty Application No. PCT/US2016/065451, dated Jan. 12, 2017, 20 pages.

Maniar, Neeta, "Centralized Tracking and Risk Analysis of 3rd Party Firewall Connections," SANS Institute InfoSec Reading Room, Mar. 11, 2005, 20 pages.

Hu, Hongxin et al., "Detecting and Resolving Firewall Policy Anomalies," IEEE Transactions on Dependable and Secure Computing, vol. 9, No. 3, May/Jun. 2012, pp. 318-331.

Woolward et al., "Template-Driven Intent-Based Security," U.S. Appl. No. 16/428,838, filed May 31, 2019, Specification, Claims, Abstract, and Drawings, 60pages.

Woolward et al., "Validation of Cloud Security Policies," U.S. Appl. No. 16/428,849, filed May 31, 2019, Specification, Claims, Abstract, and Drawings, 54 pages.

Woolward et al., "Reliability Prediction for Cloud Security Policies," U.S. Appl. No. 16/428,858, filed May 31, 2019, Specification, Claims, Abstract, and Drawings, 59 pages.

Bates, Adam Macneil, "Designing and Leveraging Trustworthy Provenance-Aware Architectures", ProQuest Dissertations and Theses ProQuest Dissertations Publishing, 2017, 147 pages.

Wang et al., "System and Method for Attributing User Behavior from Multiple Technical Telemetry Sources," U.S. Appl. No. 17/162,761, filed Jan. 29, 2021; Specification, Claims, Abstract, and Drawings, 31 pages.

Badidi et al., "A Cloud-based Approach for Context Information Provisioning," World of Computer Science and Information Technology Journal (WCSIT), vol. 1, No. 3, 2011, pp. 63-70.

Fazio et al., "Message Oriented Middleware for Cloud Computing to Improve Efficiency in Risk Management Systems," Scalable Computing: Practice and Expirence, vol. 14, No. 4, 2013, pp. 201-213.

Souto et al., "A Message-Oriented Middleware for Sensor Networks," 2nd International Workshop on Middleware for Pervasive and Ad-Hoc Computing, Oct. 18-22, 2004, Toronto, Ontario, Canada, pp. 127-134.

Wun et al., "A Policy Management Framework for Content-Based Publish/Subscribe Middleware," ACM/IFIP/USENIX International Conference on Distributed Systems Platforms and Open Distributed Processing Middleware 2007, pp. 368-388.

Wang et al., "Anomaly Detection in the Case of Message Oriented Middleware," MidSec '08: Proceedings of the 2008 workshop on Middleware security, Dec. 2008, https://doi.org/10.1145/1463342.1463350, pp. 40-42.

Carranza et al., "Brokering Policies and Execution Monitors for ioT Middleware," SACMAT '19, Jun. 3-6, 2019, Toronto, ON, Canada, pp. 49-60.

Albano et al., "Message-oriented Middleware for Smart Grids," Computer Standards & Interfaces, vol. 38, Feb. 2015, pp. 133-143.

"Middleware for Communications," Qusay Mahmoud (Ed.), John Wiiey & Sons Ltd, The Atrium, Southern Gate, Chichester, England, Jun. 29, 2004, Online ISBN:9780470862087 |DOI:10.1002/0470862084, abstract, 1 page.

(56) References Cited

OTHER PUBLICATIONS

Chew, Zhen Bob, "Modelling Message-Oriented-Middleware Brokers Using Autoregressive Models for Bottleneck Prediction," PhD diss, Queen Mary, University of London, 2013, 179 pages.

Vinoski, S. "An overview of Middleware," In: Llamosi, A, Strohmeier, A. (eds), Reliable Software Technologies—Ada-Europe 2004, Ada-Europe 2004. Lecture Notes in Computer Science, vol. 3063, Springer, Berlin, Heidelberg, https://doi.org/10.1007/978-3-540-24841-5_3, pp. 35-51.

Casola et al., "A Security Monitoring System for Internet of Things," Internet of Things, vol. 7, Sep. 2019, 20 pages.

Pierleoni et al., "Amazon, Google and Microsoft Solutions for IoT: Architectures and a Performance Comparison," in IEEE Access, vol. 8, 2020, doi: 10.1109/ACCESS.2019.2961511, pp. 5455-5470.

Rusello et al., "A Policy-Based Pulish/Subscribe Middleware for Sense-and-React Applications," Journal of Systems and Software vol. 84, No. 4, 2011 pp. 638-654.

\* cited by examiner

1000

```
COLLECT DATA CONCERNING RELATIONSHIPS BETWEEN
APPLICATIONS AND METADATA ASSOCIATED WITH THE APPLICATIONS
1002
           │
           ▼
UPDATE A GRAPH DATABASE INCLUDING NODES REPRESENTING THE
APPLICATIONS OF A COMPUTING ENVIRONMENT OF THE ENTERPRISE
AND EDGES REPRESENTING RELATIONSHIPS BETWEEN THE
APPLICATIONS
1004
           │
           ▼
ENRICH THE GRAPH DATABASE BY ASSOCIATING THE NODES WITH
THE METADATA
1006
           │
           ▼
ENRICH THE GRAPH DATABASE BY ASSOCIATING USER ACCOUNTS
ASSOCIATED WITH THE PLURALITY OF USERS WITH METADATA
ASSOCIATED WITH ROLES, ORGANIZATIONS MEMBERSHIP,
PRIVILEGES, AND PERMISSIONS ASSOCIATED WITH THE PLURALITY OF
USERS
1008
           │
           ▼
ANALYZE THE GRAPH DATABASE TO IDENTIFY A SUBSET OF NODES
BEING ACCESSED BY A USER OF THE PLURALITY OF USERS
1010
```

DISPLAY, VIA A GRAPHICAL USER INTERFACE, A GRAPHICAL REPRESENTATION OF THE SUBSET OF NODES AND RELATIONSHIPS BETWEEN THE NODES IN THE SUBSET OF THE NODES
1012

DISPLAY, VIA THE GRAPHICAL USER INTERFACE, A GRAPHICAL REPRESENTATION OF A SUBSET OF USERS DEFINED BY AT LEAST ONE OF A GROUP, A ROLE, AND AN ORGANIZATIONAL MEMBERSHIP AND RELATIONSHIPS BETWEEN THE NODES ASSOCIATED WITH THE SUBSET OF USERS
1014

DISPLAY VIA THE GRAPHICAL USER INTERFACE, A GRAPHICAL REPRESENTATION OF THE NODES REPRESENTING THE APPLICATIONS AND GROUPS OF USERS ACCESSING THE APPLICATIONS
1016

DISPLAY, VIA THE GRAPHICAL USER INTERFACE, A GRAPHICAL REPRESENTATION OF THE PERMISSIONS PROVIDED TO THE SUBSET OF USERS DEFINED BY AT LEAST ONE OF THE GROUP, THE ROLE, AND ORGANIZATIONAL UNIT IN RELATION TO THE NODES REPRESENTING THE APPLICATIONS
1018

COMPARE THE PERMISSIONS WITH RELATIONSHIPS RELATED TO ACCESSING THE APPLICATIONS BY THE SUBSET OF USERS, THE RELATIONSHIPS RELATED TO ACCESSING THE APPLICATIONS BEING RECORDED TO THE GRAPH DATABASE
1020

FIG. 10B

SYSTEMS AND METHODS FOR UNDERSTANDING IDENTITY AND ORGANIZATIONAL ACCESS TO APPLICATIONS WITHIN AN ENTERPRISE ENVIRONMENT

CROSS REFERENCE TO RELATED APPLICATIONS

The present application is a continuation-in-part of U.S. application Ser. No. 17/133,466, filed on Dec. 23, 2020 and titled "Modeling Application Dependencies to identify Operational Risk", which is a continuation-in-part and claims the priority benefit of U.S. patent application Ser. No. 16/428,828 filed on May 31, 2019 and titled "Cloud Security Management," which are hereby incorporated by reference. The U.S. application Ser. No. 16/428,828 is related to U.S. patent application Ser. No. 17/133,451 filed on Dec. 23, 2020 and titled "Modeling Topic-Based Message-Oriented Middleware Within a Security System" and U.S. patent application Ser. No. 17/133,458 filed on Dec. 23, 2020 and titled "Modeling Queue-Based Message-Oriented Middleware Relationships in a Security System." The subject matter of afore-mentioned applications is incorporated herein by reference for all purposes.

TECHNICAL FIELD

The present technology pertains to communications networks and, more specifically, to systems and methods for understanding identity and organizational access to applications within an enterprise environment.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Due to the extensive use of computer networks by enterprises, there has been a dramatic rise in network attacks, a proliferation of computer viruses, and a constant distribution of other types of malicious content that attempts to attack, infect, or otherwise infiltrate the computer networks. Attackers breach internal networks and public clouds to steal critical data. For example, attackers target low-risk assets to enter the internal network. Inside the internal network and public clouds, and behind the hardware firewall, attackers move laterally across the internal network, exploiting East-West traffic flows, to critical enterprise assets. Once there, attackers siphon off valuable company and customer data.

Tracking possible network attacks on enterprise assets can be difficult because an enterprise may include multiple organizational units. The multiple organizational units may not be rigid because users change their roles and business functions within organizational units and can belong to different organizational units.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various methods and systems for understanding identity and organizational access to applications within an enterprise environment.

According to one example embodiment, a method for understanding identity and organizational access to applications within an enterprise environment is provided. The method may include collecting data concerning relationships between applications and metadata associated with the applications in a computing environment of an enterprise. The metadata may include information concerning a plurality of users accessing the applications. The method may also include updating a graph database. The graph database may include nodes representing the applications of the computing environment of the enterprise and edges representing relationships between the applications. The method may also include enriching the graph database by associating the nodes with metadata associated with the applications. The method may include analyzing the graph database to identify a subset of nodes being accessed by a user of the plurality of users. The method may also include accessing an identity store to classify the user behavior into organizational units and roles in order to represent organizational behavior. The method may also include displaying, via a graphical user interface, a graphical representation of the subset of nodes and relationships between the nodes in the subset of the nodes and the relationship between the users and the nodes.

The metadata may include network logs of the user access events into the applications or other user activity conducted on client devices. The metadata may include telemetry data concerning access operations, time of day, a client device used, or an amount of data written to or read from the applications. The metadata may also include data from identity stores which the system can utilize to organize information into a consumable form. The metadata may also include Role Based Access Control (RBAC) rules and permissions associated with users and groups of users to understand the access currently allowed from the users to the applications.

The method may include analyzing the graph database to detect a violation by the user of an access right to at least one application of the applications. The method may include, in response to the violation, generating a security policy disallowing at least one relationship between the at least one user and at least one further application in the graph database. The method may also include permitting a subset of communications in the form of a whitelist in order to restrict the attack surface exposed to a user or group of users.

The method may include graphically visualizing usage behavior orientated around an application, or set of applications by demonstrating the organizational structure of users accessing those applications, facilitating intuitive evaluation of access patterns and business dependencies. Alternatively, those visualizations can be oriented around the behaviors of members of an organizational unit, facilitating the assessment of the dependencies of that organizational unit. Throughout the visualizations, it may be possible for the user to drill up and down in order to understand group behavior and the behavior of individuals within the group in order to evaluate outliers and anomalous behavior.

The method may include graphically visualizing the permissions provided to organizational units of users or individual users and overlaying that information with actual user behavior. This visualization may include visual identification of permissions that are not being utilized and user behavior (both attempted and successful) that violates the permissions. The method may include the identification of individual permissions that are recommended for removal and also the production of a score reflecting the accuracy of permissions which may be used by users of the system to prioritize remediation.

The method may include the scoring of risk of permissions per application based upon the understanding by the system of an application criticality and also the scope of permissions assigned, including a context relation to a degree of privilege.

The method may include the ability of users to select access relationships or permissions to be used to monitor future access behavior in order to produce alerts by the system.

The method may include automatic conversion of observed access behaviors into permissions, which can be delivered by the system in a configuration file or program via application programming interfaces (APIs) of the identity and access management system.

The method may include reporting on overall user access risk based on the scoring of permission accuracy and based on degree of privilege and application criticality.

According to another embodiment, a system for understanding identity and organizational access to applications within an enterprise environment is provided. The system may include at least one processor and a memory storing processor-executable codes, wherein the processor can be configured to implement the operations of the above-mentioned method for understanding identity and organizational access to applications within an enterprise environment.

According to yet another aspect of the disclosure, there is provided a non-transitory processor-readable medium, which stores processor-readable instructions. When the processor-readable instructions are executed by a processor, they cause the processor to implement the above-mentioned method for understanding identity and organizational access to applications within an enterprise environment.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements and in which:

FIG. 10A is a flow chart showing an example method for understanding identity and organizational access to applications within an enterprise environment, in accordance with some embodiments.

FIG. 10B is a flow chart, continuing from FIG. 10A, showing an example method for understanding identity and organizational access to applications within an enterprise environment, in accordance with some embodiments.

DETAILED DESCRIPTION

Figure 1:
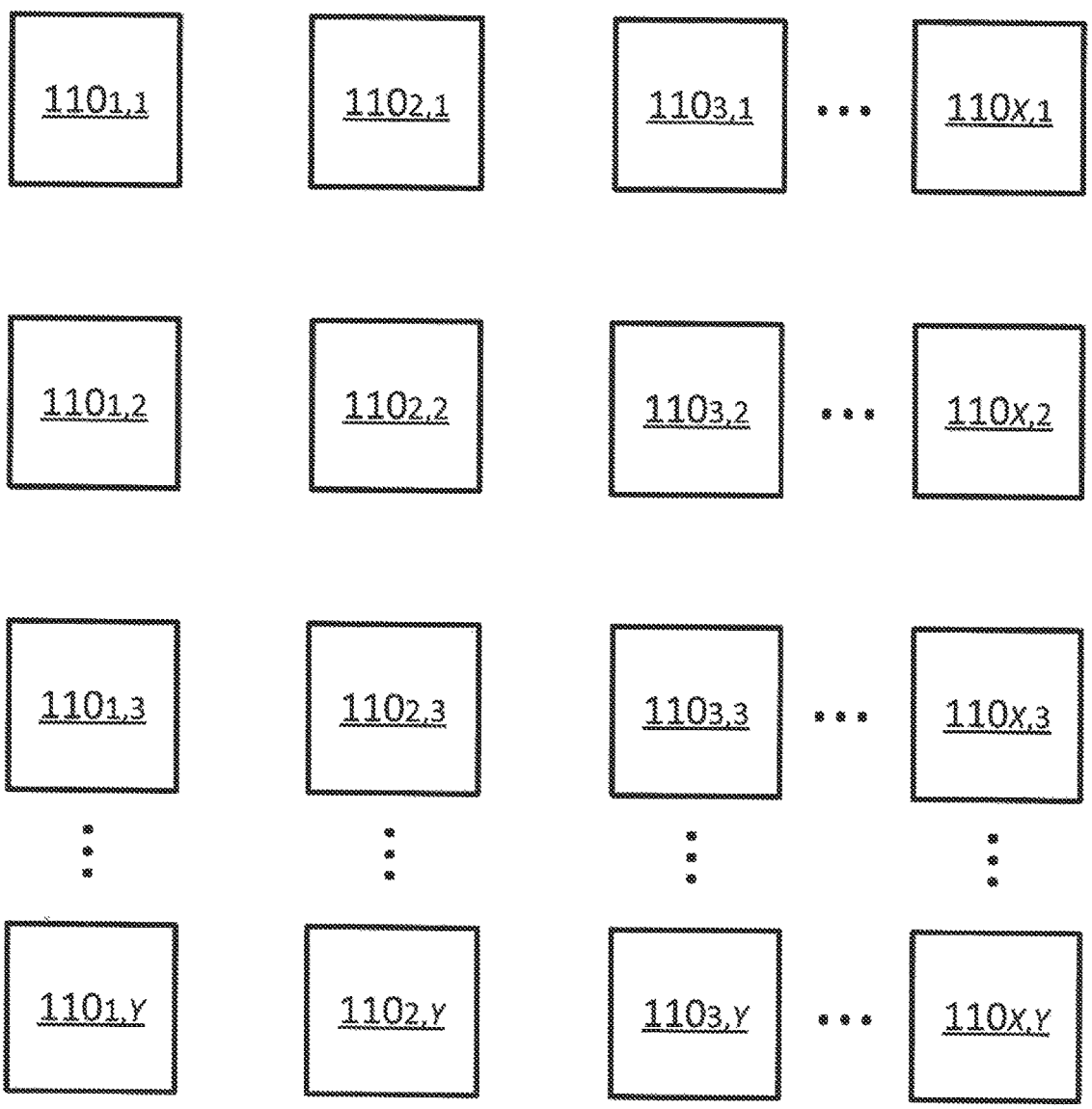
FIG. 1 is a simplified block diagram of a computing environment, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows computing environment 100 including workloads 110$_{1,1}$-110$_{X,Y}$, according to some embodiments. Computing environment 100 provides on-demand availability of computer system resources, such as data storage and computing power. Computing environment 100 can physically reside in one or more data centers and/or be physically distributed over multiple locations. Computing environment 100 can be hosted by more than one cloud service, such as those provided by Amazon, Microsoft, and Google. Computing environment 100 can be limited to a single organization (referred to as an enterprise cloud), available to many organizations (referred to as a public cloud,) or a combination of both (referred to as a hybrid cloud). Examples of public clouds include Amazon Web Services (AWS), Microsoft Azure, and Google Cloud Platform (GCP).

Each of workloads $110_{1,1}$-$110_{X,Y}$ can be a unit of computing resource, such as a physical computing system (also referred to as a bare metal server), virtual machine, container, pod, and combinations thereof. A physical computing system is computer hardware and not a virtual computing system, such as a virtual machine and container. In addition to running operating systems and applications, physical computing systems can be the hardware that virtual computing systems run on.

A virtual machine provides a substitute for a physical computing system, including functionality to execute entire operating systems. Virtual machines are created and run by a hypervisor or virtual machine monitor (VMM). A hypervisor is computer software or firmware which can run on workloads $110_{1,1}$-$110_{X,Y}$. A hypervisor uses native execution to share and manage hardware, allowing for multiple environments which are isolated from one another, yet exist on the same physical computing system.

Containers are an operating system-level virtualization method for deploying and running distributed applications without launching an entire virtual machine for each application. Containers can look like physical computing systems from the point of view of programs running in them. Generally, a computer program running on an operating system can see all resources (e.g., connected devices, files and folders, network shares, central processing unit (CPU) power, etc.) of that physical computing system. However, programs running inside a container can only see the container's contents and devices assigned to the container. A pod is a group of containers with shared storage and/or network resources, and a shared specification for how to run the containers.

A container is an instance of an image. An image can be a file, comprised of multiple layers, with information to create a complete and executable version of an application. Containers can be arranged, coordinated, and managed—including means of discovery and communications between containers—by container orchestration (e.g., Docker Swarm®, Kubernetes®, Amazon EC2 Container Service (ECS), Diego, Red Hat OpenShift, and Apache® Mesos™). In contrast to hypervisor-based virtualization, containers may be an abstraction performed at the operating system (OS) level, whereas virtual machines are an abstraction of physical hardware.

Typically, workloads $110_{1,1}$-$110_{X,Y}$ of computing environment 100 individually and/or collectively run applications and/or services. Applications and/or services are programs designed to carry out operations for a specific purpose. By way of non-limiting example, applications can be a database (e.g., Microsoft® SQL Server®, MongoDB, Hadoop Distributed File System (HDFS), etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, etc.), service-oriented architecture (SOA) and/or microservices process, object-based storage (e.g., Lustre®, EMC® Centera, Scality® RING®, etc.), directory service (e.g., Microsoft® Active Directory®, Domain Name System (DNS) hosting service, etc.), and the like.

Figure 6:
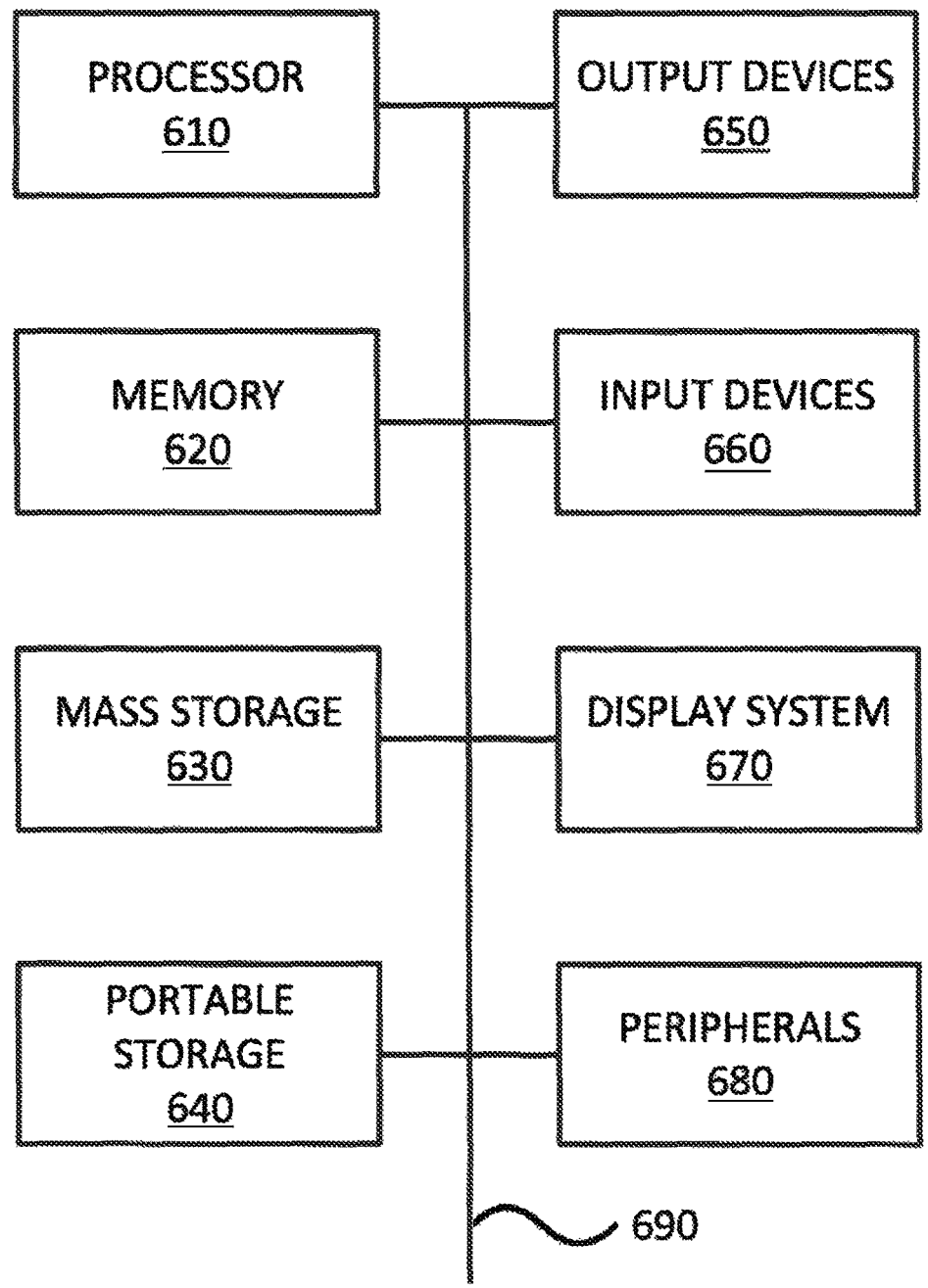
FIG. 6 is a simplified block diagram of a computing system that can be used to implement a system and a method for understanding identity and organizational access to applications within an enterprise environment, according to various embodiments.

Physical computing systems and computing environments are described further in relation to FIG. 6.

Figure 2:
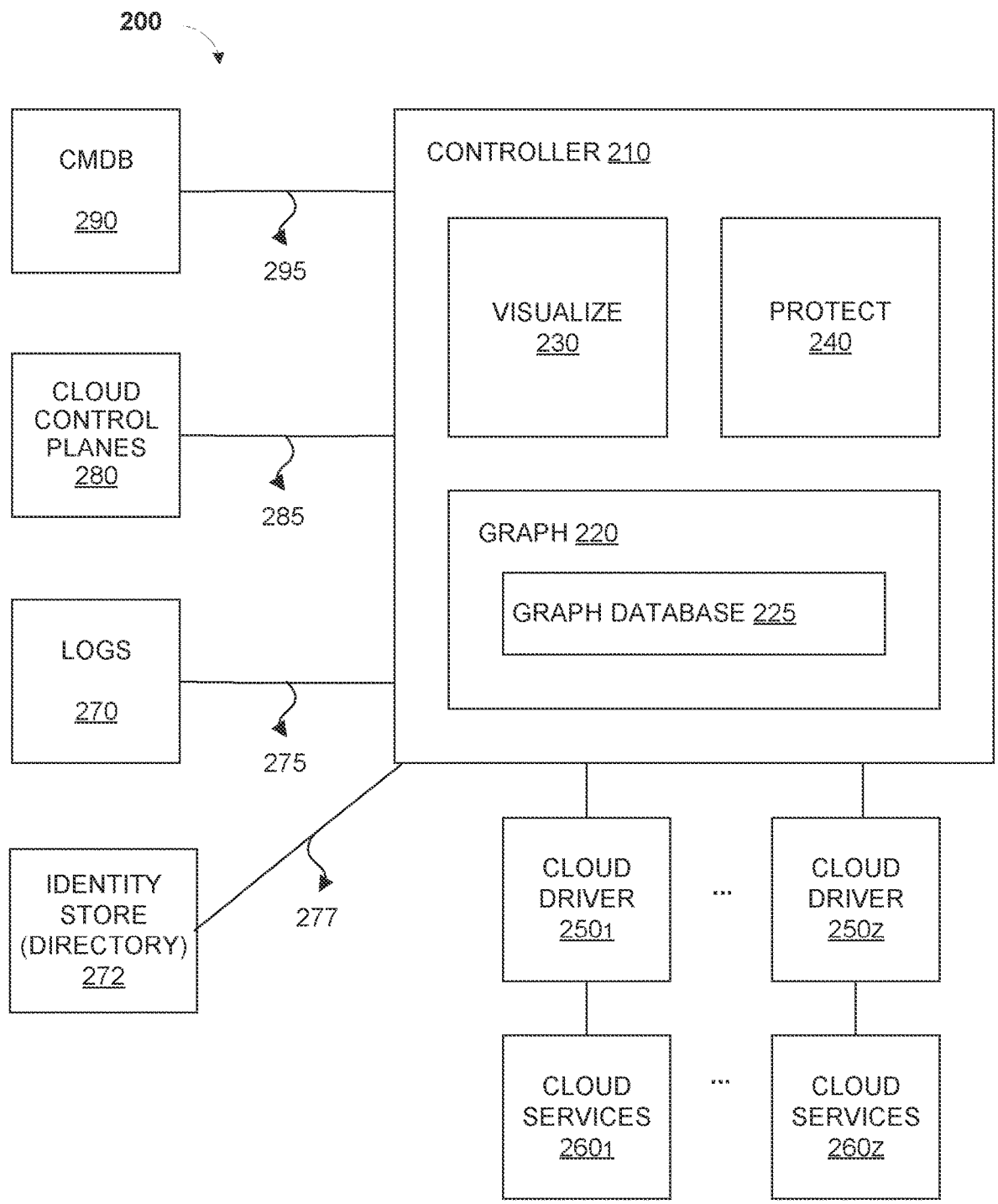
FIG. 2 is a simplified block diagram of a system for understanding identity and organizational access to applications within an enterprise environment, according to various embodiments.

FIG. 2 shows system 200 for understanding identity and organizational access to applications within an enterprise environment, according to some embodiments. System 200 includes controller 210. Controller 210 can receive streaming telemetry 275 from network logs 270, events 285 from cloud control plane 280, and inventory 295 from configuration management database (CMDB) 290.

Network logs 270 and middleware system logs can be data sources such as flow logs from cloud services $260_1$-$260_Z$ (e.g., Amazon Web Services (AWS), Microsoft Azure, and Google Cloud Platform (GCP)), vArmour DSS Distributed Security System, Software Defined Networking (SDN) (e.g., VMware NSX and Cisco Application Centric Infrastructure (ACI)), monitoring agents (e.g., Tanium Asset and Falco), and the like. Generally, streaming telemetry 275 can be low-level data about relationships between applications. Streaming telemetry 275 can include 5-tuple, layer 7 (application layer) process information, management plane logs, and the like. 5-tuple refers to a set of five different values that comprise a Transmission Control Protocol/Internet Protocol (TCP/IP) connection: a source IP address/port number, destination IP address/port number and the protocol in use. Streaming telemetry can alternatively or additionally include a volume of data (i.e., how much data is or how many data packets are) exchanged between workloads (e.g., workloads $110_{1,1}$-$110_{X,Y}$ in FIG. 1) in a network, (dates and) times at which communications (e.g., data packets) are exchanged between workloads, and the like.

Cloud control plane 280 establishes and controls the network and computing resources within a computing environment (e.g., computing environment 100 in FIG. 1). Cloud control plane 280 can include interfaces for managing assets (e.g., launching virtual machines and/or containers, configuring the network, etc.) in a computing environment. For example, cloud control plane 280 can include one or more instances of container orchestration, such as Docker Swarm®, Kubernetes®, Amazon EC2 Container Service (ECS), Diego, and Apache® Mesos™. By way of further non-limiting example, cloud control plane 280 can include VMware vSphere, APIs provided by cloud services $260_1$-$260_Z$, and the like.

Events 285 can include information about a container (and/or a pod) being created, having a state change, having an error, and the like. For example, when a container is created, information about the workload such as a service name, image deployed, and the like can be received in events 285. By way of further example, additional information from an image registry corresponding to the deployed image can be gathered by controller 210.

Configuration management database (CMDB) 290 can be a database of information about the hardware and software components (also known as assets) used in a computing environment (e.g., computing environment 100 in FIG. 1) and relationships between those components and business functions. CMDB 290 can include information about upstream sources or dependencies of components, and the downstream targets of components. For example, inventory 295 can be used to associate an application name and other information (e.g., regulatory requirements, business unit ownership, business criticality, and the like) with the workload (e.g., workloads $110_{1,1}$-$110_{X,Y}$ in FIG. 1) it is running on.

For the purposes of identity, an identity store (directory) 272 (such as Lightweight Directory Access Protocol (LDAP)) is utilized to provide metadata associated with the organizational membership of the user, including organizational unit membership, roles, groups, permissions, and administrative status.

In an example embodiment, roles of users can be stored in a database. The role may include description of actions that the user is entitled to perform according to the role. Even though the user may be allowed to perform a number of actions according to their role, the user may not necessarily perform all of the allowed actions. Furthermore, the user may perform some actions only once (e.g., when accessing the application for the first time).

Streaming identity 277, streaming telemetry 275, events 285, and inventory 295 can be ingested by graph 220. Graph 220 normalizes information received in streaming telemetry 275, events 285, and inventory 295 into a standard data format and/or model, graph database 225. Graph database 225 uses a graph data model comprised of nodes (also referred to as vertices), which is an entity such as a workload (e.g., of workloads $110_{1,1}$-$110_{X,Y}$ in FIG. 1), and edges, which represent the relationship between two nodes. Edges can be referred to as relationships. An edge can have a start node, end node, type, and direction, and an edge can describe parent-child relationships, actions, ownership, and the like. In contrast to relational databases, relationships are (most) important in graph database 225. In other words, connected data is equally (or more) important than individual data points.

Conventionally, security management systems stored raw logs of each and every individual communication between workloads. The amount of data scaled linearly and consumed massive amounts of storage. In contrast, streaming telemetry 275, events 285, and inventory 295, graph 220 (FIG. 2) can be used by graph 220 to create and update graph (database) 300. The individual communications are not stored. In this way, graph database 225 is advantageously scalable. For example, graph database 225 for a large computing environments of 30,000-50,000 workloads can be stored in memory of a workload (e.g., of workloads $110_{1,1}$-$110_{X,Y}$ in FIG. 1).

Figure 3:
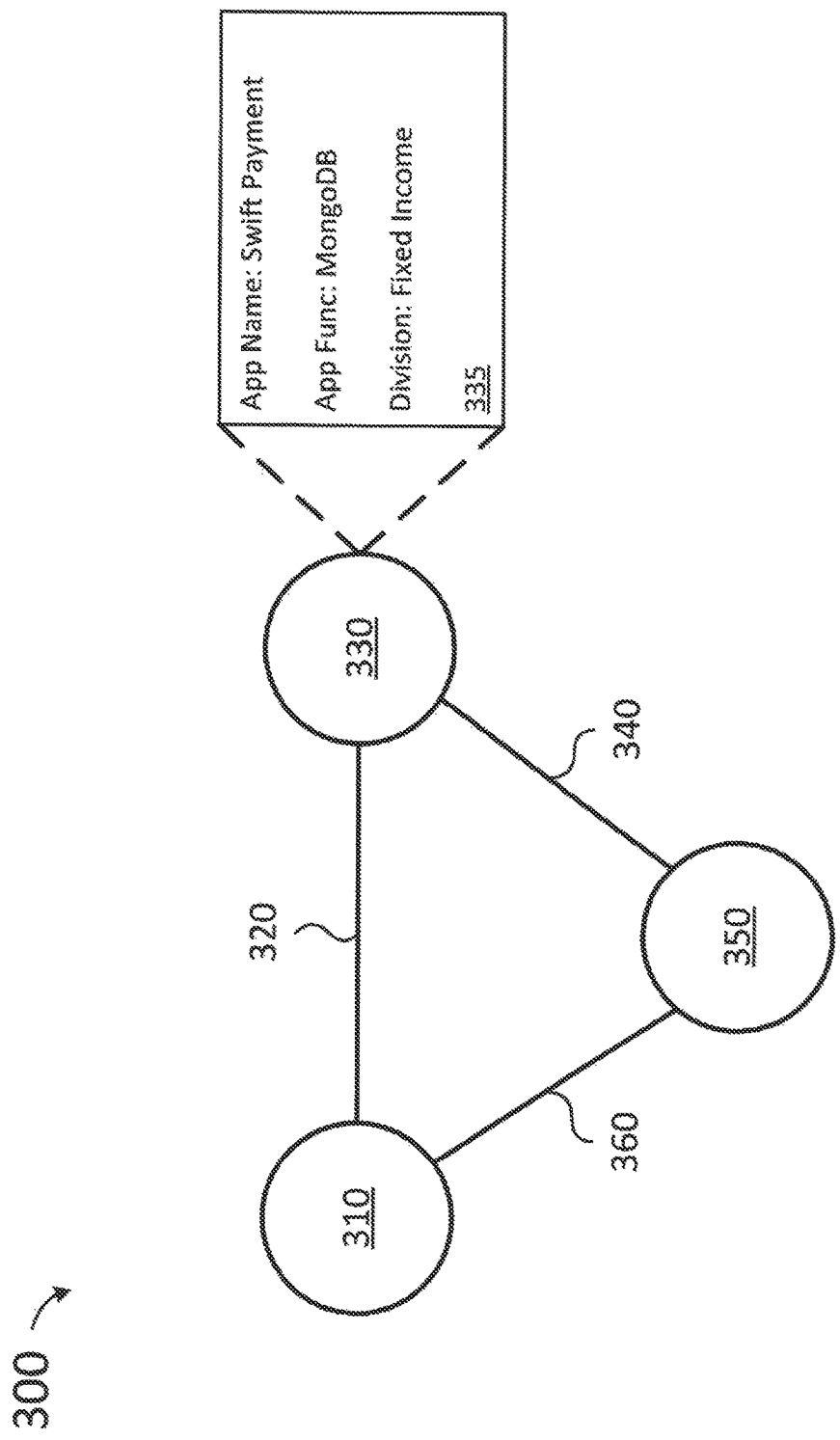
FIG. 3 depicts a simplified graph of a computing environment, in accordance with some embodiments.

FIG. 3 depicts (simplified) graph (database) 300 of a computing environment, according to various embodiments. Graph 300 is a simplified example, purely for illustrative purposes, of a graph in graph database 225 (FIG. 2). Graph 300 can include three workloads (e.g., of workloads $110_{1,1}$-$110_{X,Y}$ in FIG. 1): node 310, node 330, and node 350. As shown in FIG. 3, edge (relationship) 320 is between nodes 310 and 330 have; edge (relationship) 340 is between nodes 330 and 350; edge (relationship) 360 is between nodes 350 and 310.

Using streaming telemetry 275, events 285, and inventory 295, graph 220 (FIG. 2) can determine information 335 about node 330. By way of non-limiting example, information 335 can include an application name, application function, business organization (e.g., division within a company), realm (e.g., production system, development system, and the like), (geographic) location/zone, Recovery Time Objective ("RTO"), Recovery Point Objective ("RPO") and other metadata. Moreover, using layer 7 information (when available), the name of the database can be determined.

Referring back to FIG. 2, graph 220 can employ various techniques to manage entropy. In a computing environment (e.g., computing environment 100 in FIG. 1), entropy is change to the workloads (e.g., created and removed), communications among workloads (e.g., which workloads communicate with other workloads), applications and services provided in the network, and the like. Typically, in a (closed) enterprise cloud, entropy is low. For example, after monitoring an enterprise cloud for one month, another month of monitoring will reveal little that is new.

On the other hand, a web server connected to the Internet will have high entropy, because the number of relationships (connections) to clients on the Internet (nodes) is huge and continues to grow. To protect the size of graph database 225, graph 220 can recognize when there is high entropy and summarize the nodes. For example, the vast (and growing) number of clients on the Internet is represented by a single "Internet" object with one edge to the web server node.

According to some embodiments, a new relationship can be created around a particular node in graph database 225, as streaming telemetry 275, events 285, and inventory 295 are processed by graph 220. Graph 220 (FIG. 2) can further re-analyze the edges (relationships) connected to the particular node, to classify what the particular node is. For example, if the node accepts database client connections from systems that are known to be application servers, then graph 220 may classify the node as a database management system (i.e., a certain group). Classification criteria can include heuristic rules. Graph 220 can use machine learning algorithms and measure how close a particular node is to satisfying conditions for membership in a group. Classification is described further in U.S. patent application Ser. No. 10,264,025 issued Apr. 16, 2019, titled "Security Policy Generation for Virtualization, Bare-Metal Server, and Cloud Computing Environments," which is hereby incorporated by reference for disclosure of classification.

Figure 4A:
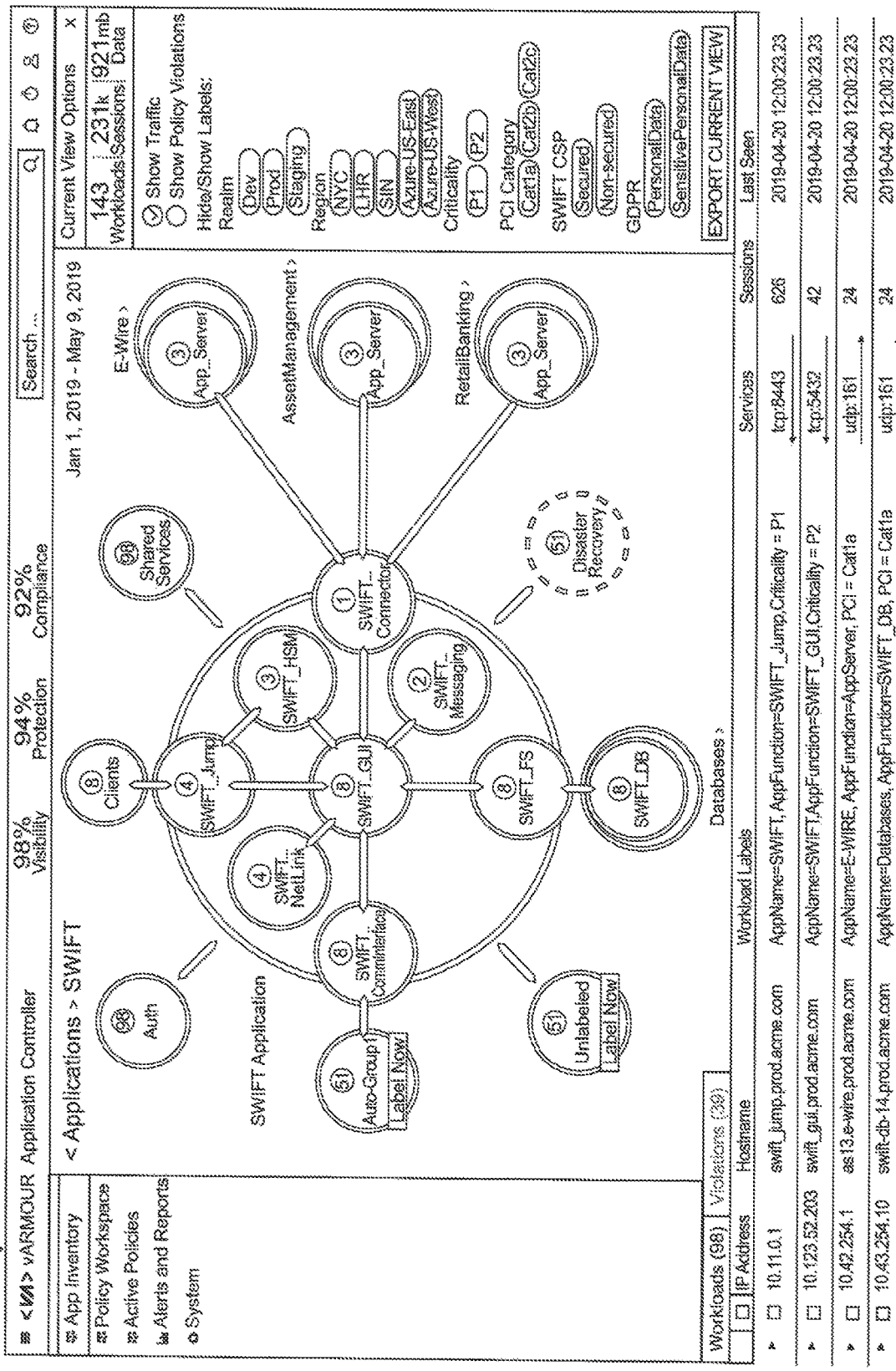
FIG. 4A shows another graph of a computing environment and FIG. 4B depicts a graph of an application, in accordance with various embodiments.
Figure 4B:
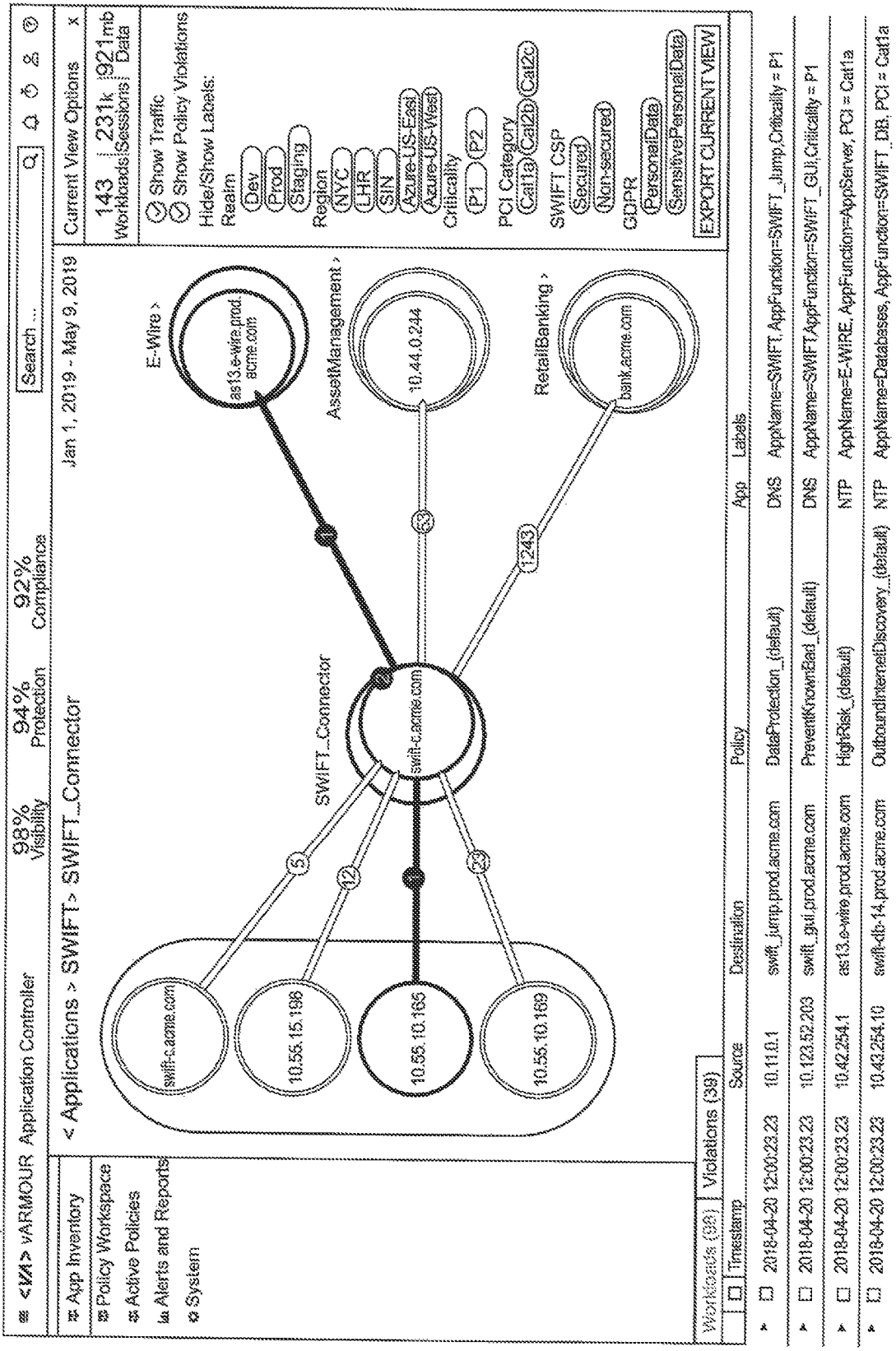

Visualize 230 can visually present information from graph database 225 to users according to various criteria, such as by application, application type, organization, and the like. FIGS. 4A and 4B show example visual presentations 400A and 400B, respectively, in accordance with some embodiments.

Visualize 230 can visually organize information from graph database 225. In some embodiments, nodes that behave similarly can be clustered together (i.e., be put in a cluster). For example, when two nodes have similar edges (relationships) and behave in a similar fashion (e.g., run the same application, are associated with the same organization, and the like), the two nodes can be clustered together. Nodes that are clustered together can be visually presented as a shape (e.g., circle, rectangle, and the like) which denotes that there are a certain number of workloads fulfilling the same function, instead of presenting a shape for each workload in the cluster.

In various embodiments, visualize 230 can detect and present communities. Communities are workloads (e.g., of workloads $110_{1,1}$-$110_{X,Y}$ in FIG. 1) that have a close set of edges (relationships). The constituent workloads of a community do not have to be the same—they can each perform different functions, such as web server, database server, application server, and the like—but the workloads are densely connected. In other words, the nodes communicate with each other often and in high volume. Workloads in a community act collectively to perform an application, service, and/or business function. Instead of displaying a shape (e.g., circle, rectangle, and the like) for each of the hundreds or thousands of workloads in a community, the community can be represented by a single shape denoting the application performed, the number of constituent workloads, and the like.

Protect 240 can use information in the graph database 225 to design security policies. Security policies can implement security controls, for example, to protect an application wherever it is in a computing environment (e.g., computing environment 100 in FIG. 1). A security policy can specify what is to be protected ("nouns"), for example, applications run for a particular organization. A security policy can further specify a security intent ("verbs"), that is, how to protect. For example, a security intent can be to implement Payment Card Industry Data Security Standard (PCI DSS) network segmentation requirements (a regulatory requirement), implement a security best practices for databases, implement a whitelist architecture, and the like. By way of further example, a security intent can be specified in a template by a user (responsible for system administration, security, and the like). As used herein, a user is represented by user account credentials associated with a human being assigned a specific role, or by a software agent.

Nouns and verbs can be described in a security template. A security template can include logic about how to process information in graph database 225 relating to workloads having a particular label/selection (nouns). Labels can be provided by logs 270 (e.g., layer 7 information), cloud control planes 280 (e.g., container orchestration), and CMDB 290. Protect 240 uses a security template to extract workloads to be protected (nouns) from graph database 225. Protect 240 further applies logic in the security template about how to protect the workloads (verbs) to produce a security policy. In various embodiments, security templates are JavaScript Object Notation (JSON) documents, documents in Jinja (or Jinja2), YAML Ain't Markup Language (YAML) documents, Open Policy Agent (OPA) rules, and the like. Jinja and Jinja2are a web template engine for the Python programming language. YAML is a human-readable data-serialization language. OPA is an open source, general-purpose policy engine that enables unified, context-aware policy enforcement. Security templates are described further in U.S. patent application Ser. No. 16/428,838 (Attorney Docket No. PA9274US) filed May 31, 2019, titled "Template-Driven Intent-Based Security," which is hereby incorporated by reference for disclosure of generating a security policy using security templates.

Protect 240 can produce multiple security policies, each reflecting independent pieces of security logic that can be implemented by protect 240. In various embodiments, security policies are JavaScript Object Notation (JSON) documents which are described to a user (responsible for system administration, security, and the like) in natural language. A natural language is any language that has evolved naturally in humans through use and repetition without conscious planning or premeditation. Natural language can broadly be defined in contrast to artificial or constructed languages such as computer programming languages. The multiple security policies can be placed in an order of precedence to resolve potential conflicts. Visualize 230 can be used to visualize the security policy (or security policies), showing the workloads protected, permitted relationships, and prohibited relationships. Protect 240 can then be used to edit the security policy. For example, there can be a primary and backup server (e.g., of workloads $110_{1,1}$-$110_{X,Y}$ in FIG. 1). The backup server may have never been used and may not have the same edges (relationships) as the primary server in graph database 225. The security policy can be edited to give the backup server the same permissions as the primary server.

Protect 240 can validate a security policy. The security policy can be simulated using graph database 225. For example, a simulation can report which applications are broken (e.g., communications among nodes needed by the application to operate are prohibited) by the security policy, are unnecessarily exposed by weak policy, and the like. Security policy validation is described further in U.S. patent application Ser. No. 16/428,849 filed May 31, 2019, titled "Validation of Cloud Security Policies," which is incorporated by reference herein for disclosure of security policy validation.

Protect 240 can test a security policy. Protect can use historical data in graph database 225 to determine entropy in the computing environment (e.g., computing environment 100 in FIG. 1). For example, when a computing environment first starts up, there are initially numerous changes as workloads are brought online and communicate with each other, such that entropy is high. Over time, the computing environment becomes relatively stable with few changes, so entropy becomes low. In general, security policies are less reliable when entropy is high. Protect 240 can determine a level of entropy in the computing environment and produce a reliability score and recommendation for the security policy. Security policy testing is described further in U.S. patent application Ser. No. 16/428,858 filed May 31, 2019, titled "Reliability Prediction for Cloud Security Policies," which is incorporated by reference herein for disclosure of security policy reliability prediction.

Protect 240 can deploy a security policy (or security policies). The security policy is deployed as needed in one or more computing environments of cloud services $260_1$-$260_Z$ (e.g., Amazon Web Services (AWS), Microsoft Azure, and Google Cloud Platform (GCP)), vArmour DSS Distributed Security System, VMware NSX, and the like). Protect 240 can provide the security policy to one or more of cloud drivers $250_1$-$250_Z$. Cloud drivers $250_1$-$250_Z$ maintain an inventory and topology (i.e., current state) of the workloads in the computing environments hosted by cloud services $260_1$-$260_Z$, respectively. Cloud drivers $250_1$-$250_Z$ can use their respective inventory and topology to apply the security policy to the appropriate workloads, and respond immediately to changes in workload topology and workload placement.

Cloud drivers $250_1$-$250_Z$ can serve as an interface between protect 240 (having a centralized security policy) and cloud services $260_1$-$260_Z$. In other words, cloud drivers $250_1$-$250_Z$ implement the security policy using the different facilities (e.g., application programming interfaces (APIs)) and capabilities available from cloud services $260_1$-$260_Z$. For example, each of cloud services $260_1$-$260_Z$ can have different syntax and semantics for implementing security controls. Moreover, each of cloud services $260_1$-$260_Z$ can have different security capabilities (e.g., communications/connections between workloads can only be expressly permitted and not expressly prohibited), rule capacity (limit on the number of rules), optimization methods, and the like.

Cloud drivers $250_1$-$250_Z$ can maintain the integrity of the security policy in the computing environments hosted by cloud services $260_1$-$260_Z$ (referred to as the "cloud"). Cloud drivers $250_1$-$250_Z$ can check that the security policy actually deployed in the cloud is as it should be, using the security policy's JSON source. When the security policy deployed in the cloud does not comport with the centralized security policy—such as when a bad actor logs into one of the cloud services and removes all the security rules—the responsible cloud driver (of cloud drivers $250_1$-$250_Z$) can re-deploy the security policy and/or raise an operational alert. Where supported, cloud services $260_1$-$260_Z$ can notify the respective cloud driver (of cloud drivers $250_1$-$250_Z$) of changes to the topology and/or configuration. Otherwise, the respective cloud driver (of cloud drivers $250_1$-$250_Z$) can poll the cloud service (cloud services $260_1$-$260_Z$) to ensure the security rules are in place.

As described above, a security policy can be pushed down to the computing environments hosted by cloud services $260_1$-$260_Z$ using cloud drivers $250_1$-$250_Z$, respectively. Additionally, or alternatively, as new data comes into graph 220 as network logs 270, events 285 from cloud control plane 280, and inventory 295, protect 240 can check the new data against the security policy to detect violations and or drift (e.g., change in the environment and/or configuration).

Protect 240 can dynamically update a security policy as changes occur in the computing environments hosted by cloud services $260_1$-$260_Z$. For example, when a container (or pod) is deployed by container orchestration, it can be given a label, and cloud control plane 280 reports a container is deployed (as events 285). Labels can be predefined to specify identifying attributes of containers (and pods), such the container's application function. When the label corresponds to an attribute covered by an active (deployed) security policy, protect 240 can dynamically add the new container to the active security policy (as a target). For example, when a pod is deployed for a particular organization and there is an active policy for that organization, the new workload is added to the security policy. Similarly, when a container is killed, the workload is removed from the security policy. Dynamically updating security policy is described further in U.S. patent application Ser. No. 9,521,115 issued Dec. 13, 2016, titled "Security Policy Generation Using Container Metadata," which is hereby incorporated by reference for disclosure of dynamically updating security policy.

Figure 5:
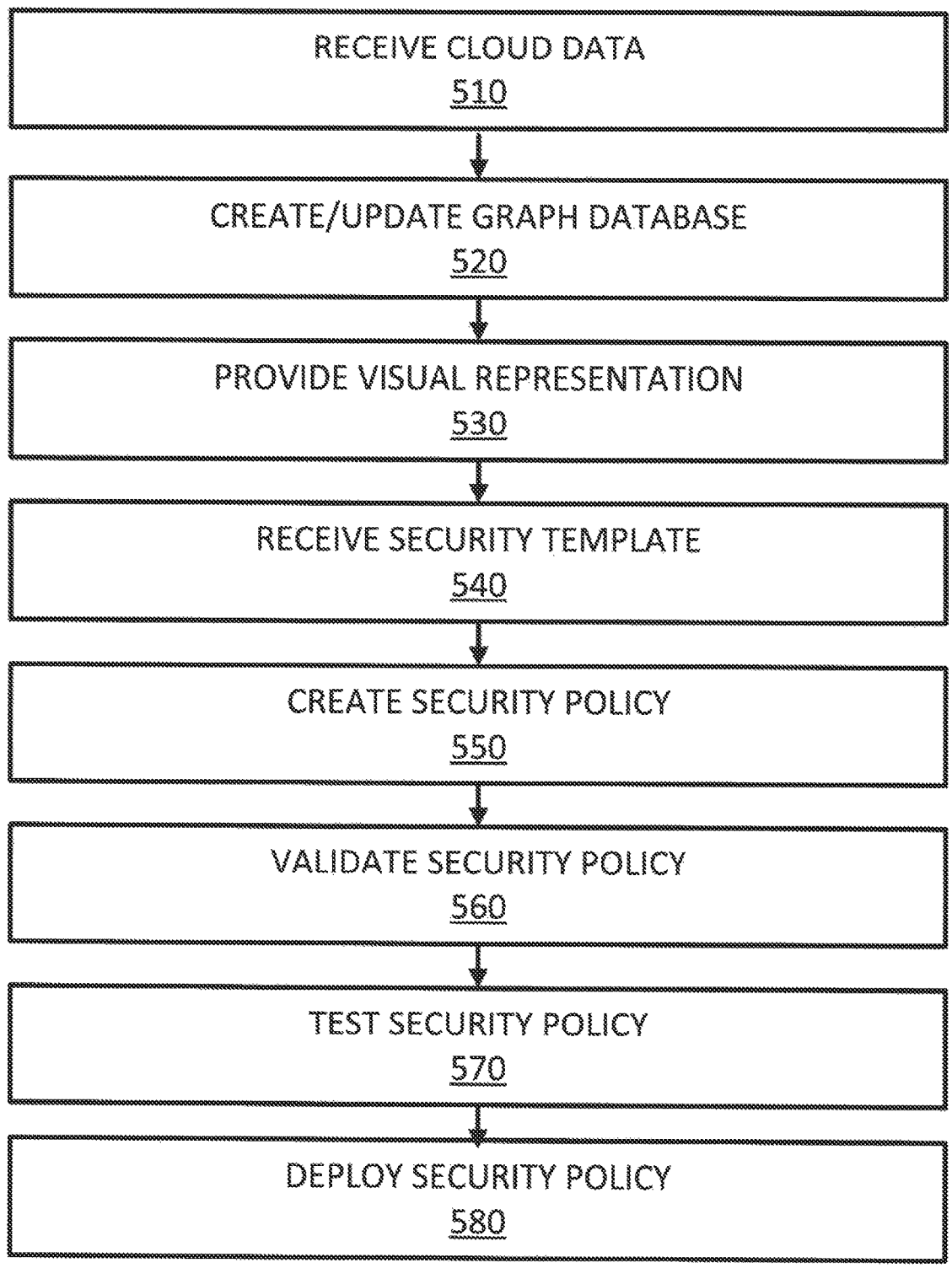
FIG. 5 is a simplified flow diagram of a method for cloud security management, according to some embodiments.

FIG. 5 shows method 500 for managing cloud security, according to some embodiments. Method 500 can be performed by system 200 (FIG. 2), including controller 210. Method 500 can commence at step 510 where data from a computing environment (e.g., computing environment 100 in FIG. 1) can be received. For example, graph 220 (FIG. 2) can receive streaming telemetry 275 from network logs 270, events 285 from cloud control plane 280, and inventory 295 from configuration management database (CMDB) 290.

At step 520, a graph database can be created or updated using the cloud data. For example, streaming telemetry 275, events 285, and inventory 295 (FIG. 2) can be normalized into a standard data format and stored in graph database 225.

At step 530, a visual representation of the computing environment as modeled by the graph database can be provided. For example, visualize 230 (FIG. 2) can present a graph using data in graph database 225. In some embodiments, nodes (representing workloads in the computing environment) can be clustered and/or placed in communities for visual clarity.

At step 540, a security template can be received. A security template can include logic about how to extract information from graph database 225 to identify workloads to be targets of a security policy. In addition, a security template can specify how the workloads are to be protected (e.g., security intent).

At step 550, a security policy can be created. For example, protect 240 can use the security template to extract information from graph database 225 (FIG. 2) to produce a security policy for the security intent of the security template.

At step 560, the security policy can be validated. For example, protect 240 (FIG. 2) tests the security policy against a historical data set stored in graph database 225. Protect 240 can generate a report around the risks and implications of the security policy being implemented.

At step 570, the security policy can be tested. For example, protect 240 (FIG. 2) can measure entropy and a rate of change in the data set stored in graph database 225 to predict—when the security policy is deployed—the computing environment (e.g., computing environment 100 in FIG. 1) will change such that applications and/or services will break (e.g., be prevented from proper operation by the security policy).

At step 580, the security policy can be deployed to the computing environment (e.g., computing environment 100 in FIG. 1). For example, cloud drivers $250_1$-$250_Z$ can produce requests, instructions, commands, and the like which are suitable for and accepted by cloud services $260_1$-$260_Z$ (respectively) to implement the security policy in the computing environments hosted by cloud services $260_1$-$260_Z$ (respectively).

Optionally at step 580, the security policy can be maintained. For example, cloud drivers $250_1$-$250_Z$ can make sure the security policy remains in force at the computing environment hosted by a respective one of cloud services $260_1$-$260_Z$. Optionally at step 580, the security policy can be dynamically updated as workloads subject to the deployed security policy are deployed and/or killed.

Although steps 510-580 are shown in a particular sequential order, various embodiments can perform steps 510-580 in different orders, perform some of steps 510-580 concurrently, and/or omit some of steps 510-580.

FIG. 6 illustrates an exemplary computer system 600 that may be used to implement some embodiments of the present invention. The computer system 600 in FIG. 6 may be implemented in the contexts of the likes of computing systems, networks, servers, or combinations thereof. The computer system 600 in FIG. 6 includes one or more processor unit(s) 610 and main memory 620. Main memory 620 stores, in part, instructions and data for execution by processor unit(s) 610. Main memory 620 stores the executable code when in operation, in this example. The computer system 600 in FIG. 6 further includes a mass data storage 630, portable storage device 640, output devices 650, user input devices 660, a graphics display system 670, and peripheral device(s) 680.

The components shown in FIG. 6 are depicted as being connected via a single bus 690. The components may be connected through one or more data transport means. Processor unit(s) 610 and main memory 620 are connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit(s) 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 in FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device.

Peripheral device(s) 680 may include any type of computer support device to add additional functionality to the computer system.

Some of the components provided in the computer system 600 in FIG. 6 can be those typically found in computer systems that may be suitable for use with embodiments of the present disclosure and are intended to represent a broad category of such computer components. Thus, the computer system 600 in FIG. 6 can be a personal computer (PC), handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 7:
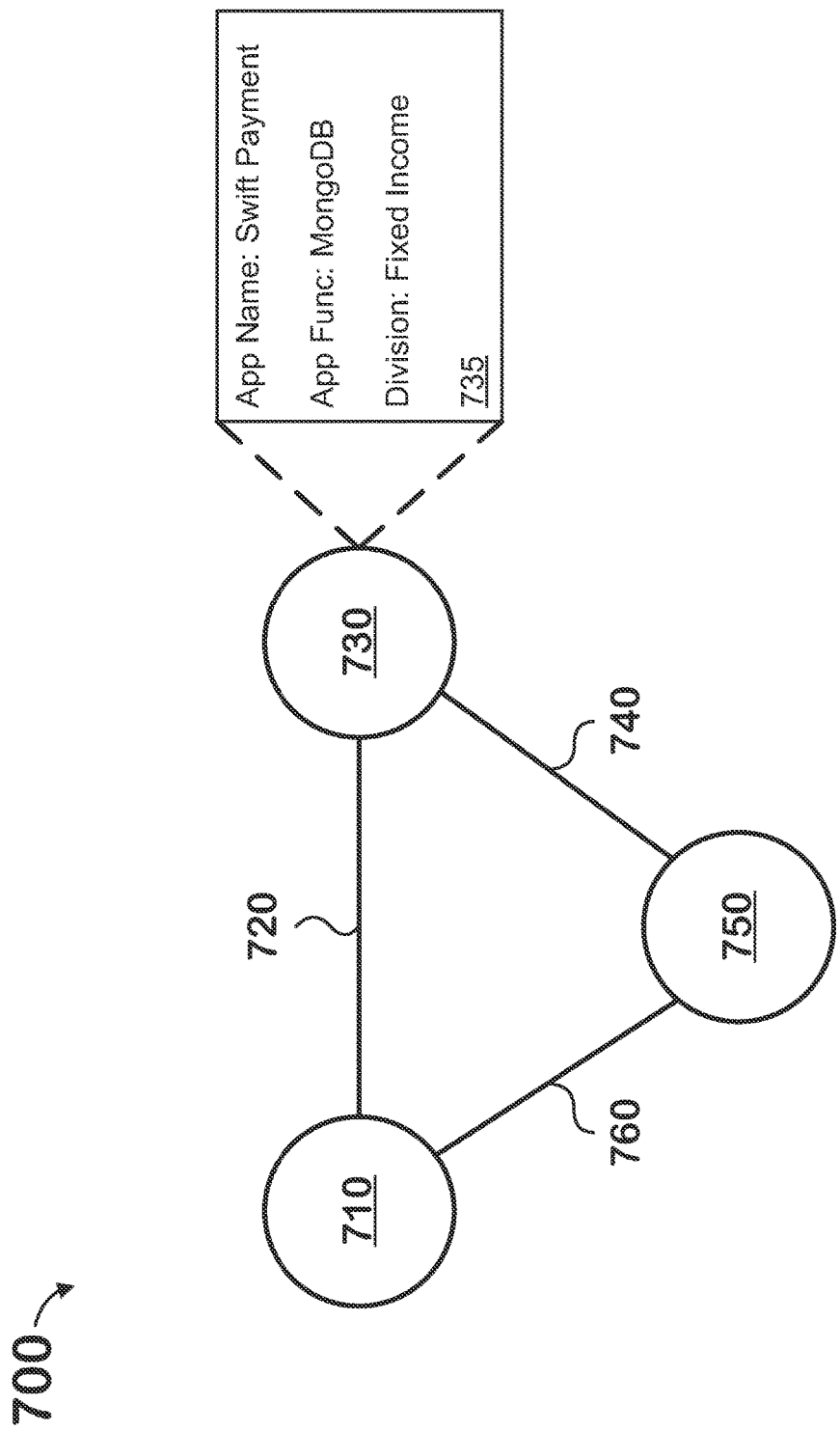
FIG. 7 depicts a simplified graph of a computing environment, in accordance with some embodiments.

FIG. 7 depicts (simplified) graph (database) 700 of a computing environment, according to various embodiments. Graph 700 is a simplified example, purely for illustrative purposes, of a graph in graph database 225 (FIG. 2). Graph 700 can include three workloads (e.g., of workloads $110_{1,1}$-$110_{X,Y}$ in FIG. 1): node 710, node 730, and node 750. As shown in FIG. 7, edge (relationship) 720 is between nodes 710 and 730; edge (relationship) 740 is between nodes 730 and 750; edge (relationship) 760 is between nodes 750 and 710.

Using streaming telemetry 275, events 285, and inventory 295, graph 220 (FIG. 2) can determine information 735 about node 730. By way of non-limiting example, information 735 can include an application name, application function, business organization (e.g., division within a company), realm (e.g., production system, development system, and the like), (geographic) location/zone, Recovery Time Objective ("RTO"), Recovery Point Objective ("RPO") and other metadata. Moreover, using layer 7 information (when available), the name of the database can be determined.

According to various exemplary embodiments, within the graph 220 (FIG. 2) and within the application controller 210 (FIG. 2), all of the information about all of the systems within a network and how they communicate over direct network connections and/or over message-oriented middleware ("MOM") is stored. Message-oriented middleware is software or hardware infrastructure supporting sending and receiving messages between distributed systems. MOM allows application modules to be distributed over heterogeneous platforms and reduces the complexity of developing applications that span multiple operating systems and network protocols. The middleware creates a distributed communications layer that insulates the application developer from the details of the various operating systems and network interfaces. APIs that extend across diverse platforms and networks are typically provided by MOM. This middleware layer allows software components (applications, Enterprise JavaBeans, servlets, and other components) that have been developed independently and that run on different networked platforms to interact with one another.

By interfacing with inventory systems such as a configuration management database ("CMDB"), which could be a ServiceNow® CMDB (for example, Node 710), an enterprise governance, risk and compliance ("GRC") tool such as RSA Archer® (for example, Node 730), or a "home built" tool such as the CMDB tools that many banks have developed (for example, Node 750), there is what is known as "common metadata." Common metadata may comprise compliance information.

For example, a system may be considered to be a Payment Card Industry Data Security Standard ("PCI DSS") Category 1 system, or the system may have certain operational service level objectives.

In one example, the system (for example, a Node) has a recovery time objective ("RTO"). This is the number of hours that a system needs to recover within in order to meet its service level agreement, its service level requirements, or its recovery point objective ("RPO"), which is the amount of time that a system can lose data.

When there is a failure, if the RPO is zero, it means the system is not allowed to lose any data. For example, by mapping into the graph relationships between systems that are publishing data and systems that are consuming data, one may query whether or not there are risks or issues relating to the ability of a system to recover.

For example, Node 710 may send out information consumed by Node 730. Node 710 may have a recovery time objective of four hours. Node 730 may have a recovery time objective of one hour. Generally, organizations know what the recovery time objective is for individual components of their systems. But they have difficulty mapping it across the dynamic dependencies that have been created. This is a problem. In the case of Node 730, it needs to recover its data within an hour. Node 710, however, might not recover the data for four hours. This is known as a "toxic combination."

According to the exemplary systems and methods herein, it has a standard set of policies to recognize where these mismatches occur. It can identify in advance problematic dependencies such as described herein.

As another example, if a system is labeled as being PCI DSS Level 1, there is a rule within the PCI DSS specification that it cannot be accessed directly from a system on the Internet. The graph will show if a system on the Internet is connecting to a system that is labelled as PCI DSS Level 1 and that it is a toxic combination. This can be prevented by writing a policy, a set of permissions, or triggering an alarm as soon as it occurs.

Another example of the ability to use this dependency mapping to find toxic combinations is if Node 730 has a recovery point objective for data loss of zero and Node 710 has a recovery point objective of one hour. Node 710 could lose data for an hour, however, Node 730 cannot afford to lose any data at all. Connecting together these dependencies based on metadata about operational requirements or compliance obligations means that the exemplary systems and methods described herein can immediately find these problems. In most cases, the application controller performs this function.

Figure 8:
FIG. 8 shows an exemplary dependency risk report for a computing environment, in accordance with some embodiments.

FIG. 8 shows an exemplary dependency risk report 800 for a computing environment, in accordance with some embodiments.

In further exemplary embodiments, multiple dependencies may be analyzed within a dependency tree. It is not constrained to just an analysis of just two assets. As shown in dependency risk report 800, 90 internal workloads, 26 dependency workloads, and 2 unknown workloads comprising 2,374 relationships, 26 relationships per workload and 226 active rules were analyzed. Additionally, the exemplary systems and methods herein may be used with audits. Auditors require organizations to prove that they have the capability to ensure that their critical functions meet their business risk requirements. The output of this system can show when a mismatch occurs or when a violation occurs. For example, dependency risk report 800 shows four violations between two nodes (source and destination, respectively) where each violation is recovery time objective ("RTO") mismatch of 1 to 4. For example, the source needs to recover its data in 1 hour, however, the destination might take up to four hours to recover its data. A violation can occur for a number of reasons. It could be because the needs of an application have changed, and/or it could be because there is a new dependency between applications.

In some exemplary embodiments, organizations can produce an audit trail to prove that they have continuous and immediate capability to understand when risk profiles change. They can also demonstrate that they have a means of preventing risk profiles from changing. For example, the exemplary systems and methods herein can prevent a relationship between an out of scope PCI DSS system and a properly functioning PCI DSS Level 1 system that stores and processes credit card information.

Many regulatory agencies feel that business continuity should not be focused only on the planning process to recover operations after an event, but it should include the continued maintenance of systems and controls for the resilience of operations. Resilience incorporates, prior to measures to mitigate disruptive events, the ability to evaluate an entity's recovery capabilities. The exemplary systems and methods herein can automatically mitigate any toxic combinations in a complex network. Rules can be generated to find where there are combinations of conditions that will not allow an organization to meet their resilience and operational risk requirements. In some cases, policies may be provided with the system upon acquisition. But equally, users can label the system with their own operational conditions or their own metadata and write a rule, which allows them to evaluate when a problematic combination of things exists.

Figure 9:
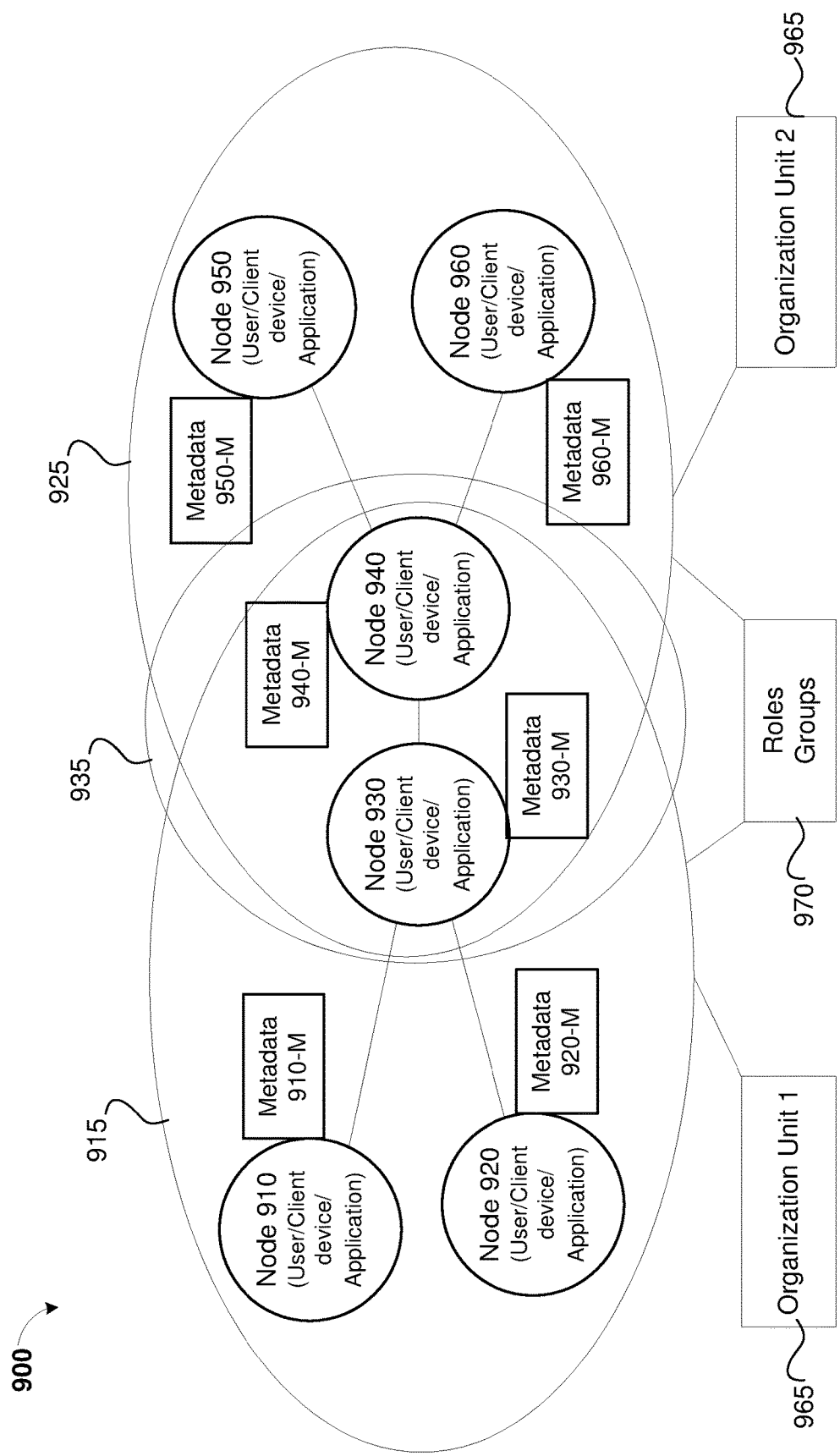
FIG. 9 is a simplified graph of a computing environment, in accordance with some embodiments, in accordance with some embodiments.

FIG. 9 is a simplified graph database 900 of a computing environment, in accordance with some embodiments. The graph database 900 includes nodes 910, 920, 930, 940, 950, and 960. Each of the nodes 910-960 may represent a user, a client device associated with the user, and an application that can be run on one of the computing instances, such as a client device, a workload, bare-metal server, cloud-based instance, mobile client device, Internet of Things (IoT) device, point of delivery (PoD), one of middleware devices, such as a message queuer or user identifier, and so forth. Edges between the nodes 910-960 in the graph database 900 may represent relationships between the users, client devices, and applications. An example relationship may include data network connection between the applications.

The nodes 910-960 can be enriched with metadata 910-M, 920-M, 930-M, 940-M, 950-M, and 960-M. The metadata 910-M, 920-M, 930-M, 940-M, 950-M may include information concerning users accessing the applications corresponding to the nodes 910, 920, 930, 940, 950, and 960. The metadata 910-M, 920-M, 930-M, 940-M, 950-M can be collected by controller 210 from network logs 270 (shown in FIG. 2). The metadata 910-M, 920-M, 930-M, 940-M, 950-M may include user login names, organizational units 965 the users belong to, roles and groups 970 of the user within the organizational units. The metadata 910-M, 920-M, 930-M, 940-M, 950-M may also include business functions, the applications, regulatory requirements associated with the applications, recovery objectives, cyber security context, types of operations conducted, access operations, time of day, client devices used by the users, and so forth.

The metadata may also include information concerning connections between the applications. The information concerning the connections can be used to determine relationships between the nodes. For example, if two applications communicate with each other, via an Application Programming Interface (API) gateway, these two applications need to identify, authenticate, and authorize each other. These applications may pass a set of credentials and establish a set of tokens, Jason web tokens to allow these applications to transact with each other. The relationships between the applications can be mapped based on flow telemetry. The relationships can be attributed meanings based of semantics of identity, such as a person identity associated with a user, machine identity, and API identity.

The metadata discovered about user access behavior may include network logs of the user access events into the applications or other user activity conducted on client devices. The metadata may include telemetry data concerning access operations, time of day, a client device used or an amount of data written to or read from the applications. The metadata may also include data from an identity store utilized by the system to organize information into a consumable form around organization units, groups, and roles. The metadata may also include the RBAC rules and permissions associated with the users and groups of users to understand the access to the applications currently allowed for the users.

The controller 210 can analyze metadata to determine the access behavior of users within different organizational units defined within the identity store. This access behavior can be compared against policies that are defined around organizational access permissions to ensure that corporate policies are not breached.

For example, the first organizational unit may be a trading department in a bank and the second organizational unit may be an advisory department of the same bank. Advisors in the advisory department may possess insider information (e.g., acquisition negotiations). The traders in the trader department are not allowed to have access to the insider information because it is against the law.

In other embodiments, the subset 915 may include applications used by users performing a first role in the enterprise and the subset 925 may include applications used by users performing a second role in the enterprise. The subset 935 may represent potentially vulnerable nodes if security rules of the enterprise prohibit using the same applications or access the same data by users with different roles or business functions within the enterprise.

The roles of users, groups of users within the enterprise, and applications used by the enterprise are not static. The users may also be members of overlapping groups. Therefore, the graph database needs to be constantly updated and analyzed to determine inappropriate combinations of roles of users and overlapping groups. The automated updating may occur continuously via APIs. This approach may allow detecting, for example, when the movement of a user to another organizational unit violates a policy for access to resources across organizational units.

Some embodiments may allow assessing the relationships between the applications and groups of users. The groups may include groups of employees within an organizational unit, employees with similar roles, groups of customers of the enterprise, and so forth. Certain embodiments may allow detecting attempts or potential exploits to gain access between different environments. The detection of potential exploits may be implemented with monitoring policies, so if anybody in the future attempts to gain access between different environments, an authorized person can be notified immediately. The detection of potential exploits may also allow creating a security policy. The security policy may allow only those relationships that have been established and validated, and disallow creation of any other relationships in the future.

Alternatively, the prevention of potential exploits may be implemented using RBAC-based permissions which are deployed via API onto the Identity Access Management (IAM) system within the environment (for example, LDAP, Okta, Sailpoint). This approach facilitates the prevention of access which violates corporate policy. These RBAC policies can be defined via a whitelist (commonly known as a zero trust rule set) or as a backlist defining the access that in not permitted.

Some embodiments may allow, upon identifying current relationships between different environments, review of the relationships between applications and creating a baseline. The baseline may include currently allowed relationships. The graph database can be constantly updated based on metadata collected from networks logs and analyzed to detect deviations from the baseline.

The graph database can be analyzed to determine connections between the applications associated with an individual user, users of a specific role, or users belonging to specific groups. The result of this analysis may allow providing a view of functions of a department, division, and members of the certain roles within the enterprise. This analysis may also be used to represent the groups of users accessing an application to enable an application owner to improve the access policies for their service.

FIG. 10 is a flow chart showing an example method 1000 for understanding identity and organizational access to applications within an enterprise environment, in accordance with some embodiments. The method 1000 can be performed by system for understanding identity and organizational access to applications within an enterprise environment of the present disclosure.

The method 1000 may commence in block 1002 with collecting data concerning relationships between applications and metadata associated with the applications in a computing environment of an enterprise. The metadata may include information concerning a plurality of users accessing the applications. The metadata may include network logs of the logins of the users into the applications and network communications between systems to which users are connected and the applications. The metadata may include telemetry data concerning an amount of data written to or read from the applications and operations performed during the access session where available.

In block 1004, the method 1000 may include updating a graph database including nodes representing the applications of the computing environment of the enterprise and edges representing relationships between the applications.

In block 1006, the method 1000 may include enriching the graph database by associating the nodes with metadata associated with the applications.

In block 1008, the method 1000 may include enriching the graph database by associating user accounts associated with the plurality of users with metadata associated with roles, organizational membership, privileges, and permissions provided to the users through an IAM system.

In block 1010, the method 1000 may include analyzing the graph database to identify a subset of nodes being accessed by a user of the plurality of users.

In block 1012, the method 1000 may include displaying, via a graphical user interface, a graphical representation of the subset of nodes and relationships and permissions between the nodes in the subset of the nodes.

In block 1014, the method 1000 may display, via the graphical user interface, a graphical representation of a subset of users defined by at least one of a group, a role, and an organizational membership, and relationships between the nodes associated with the subset of users.

In block 1016, the method 1000 may display, via the graphical user interface, a graphical representation of the nodes representing the applications and groups of users accessing the applications.

In block 1018, the method 1000 may display, via the graphical user interface, a graphical representation of the permissions provided to the subset of users defined by at least one of the group, the role, and organizational unit in relation to the nodes representing the applications.

In block 1020, the method 1000 may compare the permissions with relationships related to accessing the applications by the subset of users. The relationships related to accessing the applications may be recorded to the graph database.

The method 1000 may further include analyzing the graph database to detect a violation by the user of an access right to at least one application of the applications.

The method 1000 may further include generating, in response to the violation, a security policy disallowing at least one relationship between the at least one application and at least one further application in the graph database.

In an example embodiment, the method 1000 may include accessing an identity store to classify behavior of the plurality of users into organizational units and roles associated with the plurality of users to represent organizational behavior associated with the plurality of users.

The method 1000 may further include permitting a subset of communications between the nodes by generating a whitelist identifying at least one user of the plurality of users permitted to access at least one application.

In an example embodiment, the method 1000 may include identifying one or more of the permissions unutilized by at least one of the plurality of users and generate a score reflecting an accuracy of the permissions provided to the plurality of users. The one or more of the permissions may be recommended for removal. Additionally, a risk associated with permissions for each application may be scored to determine a criticality associated with the applications, and a degree of privilege associated with the plurality of users. An overall user access risk may be determined based on the accuracy of the permissions, the criticality associated with the applications, and the degree of privilege associated with the plurality of users.

The method 1000 may further include generating further permissions for the plurality of users based on the metadata associated with accessing the applications by the plurality of users.

The method 1000 may include providing a graphical representation of actions of the user with respect to the actions the user is entitled to perform and actions that the user actually performs with respect to the application. Thus, the system can analyze the activity and behavior of users, and analyze the information related to the access of the users to the application and actions performed by the users with respect to the application. Permissions provided to the user based on the role may be compared with access of the user to the application and actions performed by the user with respect to the application. If it is determined that a part of permissions are not used by the user, the authorized person may decide to remove one or more actions from the user permissions. Changing permission for user access by disallowing the one or more actions that have been never performed by the user of a particular role or users of a particular organizational unit may help reduce security risk associated with the application. Therefore, the system can enable comparing permissions given to a user and permissions used by the user, determining that the permissions provided to the user are broader than necessary (e.g., some permissions are never used by the user), and allow limiting the permissions.

Figure 11:
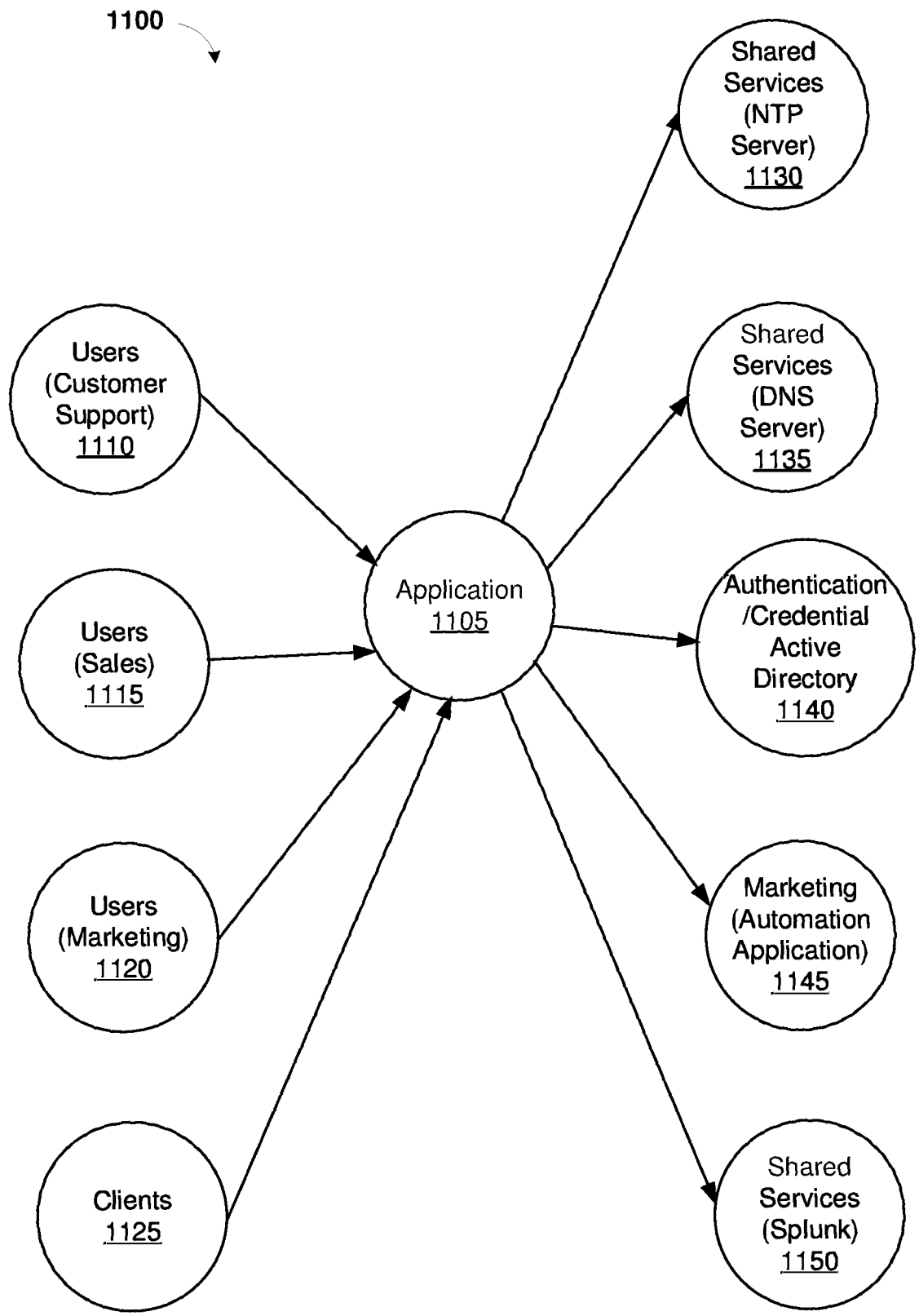
FIG. 11 is a schematic diagram showing relationships between nodes in a graph, according to an example embodiment.

FIG. 11 is a schematic diagram 1100 showing relationships between nodes in a graph, according to an example embodiment. A node representing an application 1105 may be connected with (i.e., may have relationships with) a plurality of nodes representing users. The users may include users 1110 of a customer support department, users 1115 of a sales department, users 1120 of a marketing department, and clients 1125. The application 1105 may be connected with (i.e., may have relationships with) a plurality of services provided by the application 1105. The services may include shared services 1130 associated with a Network Time Protocol (NTP) server, shared services 1135 associated with a Domain Name System (DNS) server, authentication/credential active directory 1140, marketing services 1145 (e.g., an automation application), and shared services 1150 associated with a Splunk service.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A system comprising:
    at least one processor; and
        a memory communicatively coupled to the at least one processor, the memory storing instructions executable by the at least one processor to perform a method comprising:
            collecting data about relationships between applications and metadata associated with the applications in a computing environment of an enterprise, the metadata including information concerning a plurality of users accessing the applications, the data comprising streaming identity, telemetry, events, and inventory;
            normalizing the telemetry, the events, and the inventory;
            updating a graph database including nodes representing the applications of the computing environment of the enterprise and edges representing relationships between the applications, each edge having a start node, an end node, a type, and a direction;
            enriching the graph database by associating the nodes with metadata associated with the applications;
            enriching the graph database by associating user accounts associated with the plurality of users with metadata associated with roles, organizational membership, privileges, and permissions associated with the plurality of users;
            analyzing the graph database to identify a subset of nodes being accessed by a user of the plurality of users;
            displaying, via a graphical user interface, a graphical representation of the subset of nodes and relationships between the nodes in the subset of the nodes;
            displaying, via the graphical user interface, a graphical representation of a subset of users defined by at least one of a group, a role, and an organizational membership and relationships between the nodes associated with the subset of users;
            displaying, via the graphical user interface, a graphical representation of the nodes representing the applications and groups of users accessing the applications;
            displaying, via the graphical user interface, a graphical representation of the permissions provided to the subset of users defined by at least one of the group, the role, and organizational unit in relation to the nodes representing the applications;
            comparing the permissions with relationships related to accessing the applications by the subset of users, the relationships related to accessing the applications being recorded to the graph database; and
            permitting a subset of communications between the nodes by generating a whitelist identifying at least one user of the plurality of users permitted to access at least one application, the whitelist including Role Based Access Control (RBAC) rules and permissions associated with the plurality of users to understand access currently allowed from the plurality of users to the applications, the permissions deployed via an application programing interface (API) onto an identity access management (IAM) system within the computing environment.

2. The system of claim 1, wherein the metadata includes network logs of access events of the plurality of users into the applications.

3. The system of claim 1, wherein the metadata includes telemetry data concerning an amount of data written to or read from the applications, types of operations conducted, access operations, time of day, and a client device used by the plurality of users.

4. The system of claim 1, wherein the at least one processor is further configured to:
analyze the graph database to detect a violation by the user of an access right to at least one application of the applications; and
in response to the violation, generate a security policy disallowing at least one relationship between the at least one application and at least one further application in the graph database.

5. The system of claim 1, wherein the at least one processor is further configured to access an identity store to classify behavior of the plurality of users into organizational units and roles associated with the plurality of users to represent organizational behavior associated with the plurality of users.

6. The system of claim 1, wherein the at least one processor is further configured to:
identify one or more of the permissions unutilized by the at least one user of the plurality of users;
generate a score reflecting an accuracy of the permissions provided to the plurality of users; and
recommend the one or more of the permissions for removal from the permissions.

7. The system of claim 6, wherein the at least one processor is further configured to score a risk associated with the permissions for each of the applications to determine a criticality associated with the applications, and a degree of privilege associated with the plurality of users.

8. The system of claim 7, wherein the at least one processor is further configured to determine an overall user access risk based on the accuracy of the permissions, the criticality associated with the applications, and the degree of privilege associated with the plurality of users.

9. The system of claim 1, wherein the at least one processor is further configured to generate, based on the metadata associated with the accessing the applications by the plurality of users, further permissions for the plurality of users.

10. A method comprising:
collecting data about relationships between applications and metadata associated with the applications in a computing environment of an enterprise, the metadata including information concerning a plurality of users accessing the applications, the data comprising streaming identity, telemetry, events, and inventory;
normalizing the telemetry, the events, and the inventory;
updating a graph database including nodes representing the applications of the computing environment of the enterprise and edges representing relationships between the applications, each edge having a start node, an end node, a type, and a direction;
enriching the graph database by associating the nodes with metadata associated with the applications;
enriching the graph database by associating user accounts associated with the plurality of users with metadata associated with roles, organizational membership, privileges, and permissions associated with the plurality of users;
analyzing the graph database to identify a subset of nodes being accessed by a user of the plurality of users;
displaying, via a graphical user interface, a graphical representation of the subset of nodes and relationships between the nodes in the subset of the nodes;
displaying, via the graphical user interface, a graphical representation of a subset of users defined by at least one of a group, a role, and an organizational membership and relationships between the nodes associated with the subset of users;
displaying, via the graphical user interface, a graphical representation of the nodes representing the applications and groups of users accessing the applications;
displaying, via the graphical user interface, a graphical representation of the permissions provided to the subset of users defined by at least one of the group, the role, and organizational unit in relation to the nodes representing the applications;
comparing the permissions with relationships related to accessing the applications by the subset of users, the relationships related to accessing the applications being recorded to the graph database; and
permitting a subset of communications between the nodes by generating a whitelist identifying at least one user of the plurality of users permitted to access at least one application, the whitelist including Role Based Access Control (RBAC) rules and permissions associated with the plurality of users to understand access currently allowed from the plurality of users to the applications, the permissions deployed via an application programming interface (API) onto an identity access management (IAM) system within the computing environment.

11. The method of claim 10, wherein the metadata includes network logs of access events of the plurality of users into the applications.

12. The method of claim 10, wherein the metadata includes telemetry data concerning an amount of data written to or read from workloads running the applications, types of operations conducted, access operations, time of day, and a client device used by the plurality of users.

13. The method of claim 10, further comprising:
analyzing the graph database to detect a violation by the user of an access right to at least one application of the applications; and
in response to the violation, generating a security policy disallowing at least one relationship between the at least one application and at least one further application in the graph database.

14. The method of claim 10, further comprising accessing an identity store to classify behavior of the plurality of users into organizational units and roles associated with the plurality of users to represent organizational behavior associated with the plurality of users.

15. The method of claim 10, further comprising:
identifying one or more of the permissions unutilized by the at least one user of the plurality of users;
generating a score reflecting an accuracy of the permissions provided to the plurality of users; and
recommending the one or more of the permissions for removal from the permissions.

16. The method of claim 15, further comprising scoring a risk associated with the permissions for each of the applications to determine a criticality associated with the applications, and a degree of privilege associated with the plurality of users.

17. The method of claim 16, further comprising determining an overall user access risk based on the accuracy of the permissions, the criticality associated with the applications, and the degree of privilege associated with the plurality of users.

18. A non-transitory processor-readable medium having embodied thereon a program being executable by at least one processor to perform a method comprising:
    collecting data about relationships between applications and metadata associated with the applications in a computing environment of an enterprise, the metadata including information concerning a plurality of users accessing the applications, the data comprising streaming identity, telemetry, events, and inventory;
    normalizing the telemetry, the events, and the inventory;
    updating a graph database including nodes representing the applications of the computing environment of the enterprise and edges representing relationships between the applications, each edge having a start node, an end node, a type, and a direction;
    enriching the graph database by associating the nodes with metadata associated with the applications;
    enriching the graph database by associating user accounts associated with the plurality of users with metadata associated with roles, organizational membership, privileges, and permissions associated with the plurality of users;
    analyzing the graph database to identify a subset of nodes being accessed by a user of the plurality of users;
    displaying, via a graphical user interface, a graphical representation of the subset of nodes and relationships between the nodes in the subset of the nodes;
    displaying, via the graphical user interface, a graphical representation of a subset of users defined by at least one of a group, a role, and an organizational membership and relationships between the nodes associated with the subset of users;
    displaying, via the graphical user interface, a graphical representation of the nodes representing the applications and groups of users accessing the applications;
    displaying, via the graphical user interface, a graphical representation of the permissions provided to the subset of users defined by at least one of the group, the role, and organizational unit in relation to the nodes representing the applications;
    comparing the permissions with relationships related to accessing the applications by the subset of users, the relationships related to accessing the applications being recorded to the graph database; and
    permitting a subset of communications between the nodes by generating a whitelist identifying at least one user of the plurality of users permitted to access at least one application, the whitelist including Role Based Access Control (RBAC) rules and permissions associated with the plurality of users to understand access currently allowed from the plurality of users to the applications, the permissions deployed via an application programming interface (API) onto an identity access management (IAM) system within the computing environment.

* * * * *